(12) United States Patent
Troutman et al.

(10) Patent No.: US 10,414,222 B2
(45) Date of Patent: Sep. 17, 2019

(54) SWIVEL BRACKET ASSEMBLY FOR A CONNECTOR

(71) Applicant: Truck-Lite Co., LLC, Falconer, NY (US)

(72) Inventors: Scott Troutman, Falconer, NY (US); Roger Elmer, Russell, PA (US); Todd Kolstee, North Clymer, NY (US)

(73) Assignee: Truck-lite Co, LLC, Falconer, NY (US)

( * ) Notice: Subject to any disclaimer, the term of this patent is extended or adjusted under 35 U.S.C. 154(b) by 0 days.

(21) Appl. No.: 15/904,135

(22) Filed: Feb. 23, 2018

(65) Prior Publication Data

US 2018/0244117 A1 Aug. 30, 2018

Related U.S. Application Data

(60) Provisional application No. 62/463,493, filed on Feb. 24, 2017.

(51) Int. Cl.

| B60D 1/64 | (2006.01) |
|---|---|
| H01R 35/02 | (2006.01) |
| H01R 35/04 | (2006.01) |
| H01R 13/52 | (2006.01) |
| H01R 13/73 | (2006.01) |

(52) U.S. Cl.
CPC .......... *B60D 1/64* (2013.01); *H01R 13/5202* (2013.01); *H01R 13/5213* (2013.01); *H01R 13/73* (2013.01); *H01R 35/02* (2013.01); *H01R 35/04* (2013.01); *H01R 2201/26* (2013.01)

(58) Field of Classification Search
CPC ......... F21V 19/00; H01R 13/73; H01R 35/00; H01R 35/02; H01R 35/04; H01R 2201/26; B60D 1/64; B60R 16/02
See application file for complete search history.

(56) References Cited

U.S. PATENT DOCUMENTS

| 6,743,025 | B2 | 6/2004 | Howard |
| 7,258,559 | B2 | 8/2007 | Mattern et al. |
| 7,404,591 | B2* | 7/2008 | Bender ............... H01R 13/005 296/164 |
| 8,052,164 | B2 | 11/2011 | Alguera et al. |
| 8,066,298 | B2 | 11/2011 | Alguera Gallego et al. |
| 8,157,569 | B1* | 4/2012 | Liu ....................... H01R 35/04 439/11 |
| 8,932,064 | B2 | 1/2015 | Jacobs et al. |
| 9,231,314 | B2 | 1/2016 | Peterson et al. |
| 10,063,021 | B1* | 8/2018 | Lipke .................... H01R 24/64 |
| 2005/0046148 | A1 | 3/2005 | Reutlinger et al. |
| 2006/0240695 | A1 | 10/2006 | Mattern et al. |
| 2009/0096188 | A1 | 4/2009 | Alguera Gallego et al. |
| 2013/0040467 | A1 | 2/2013 | Jacobs et al. |

* cited by examiner

*Primary Examiner* — Vanessa Girardi
(74) *Attorney, Agent, or Firm* — The Bilicki Law Firm, PC

(57) ABSTRACT

Embodiments disclosed herein include a swivel connector assembly and method of securing a swivel connector assembly to a tractor-trailer system comprising a non-rigid, movable socket to reduce stress on the connection interface when a tractor makes a turn. The axis of the socket follows and approximates the axis of the tractor as the electrical cord stretches, while the swivel connector assembly provides more than a single axis of rotation to accommodate multiple angles of cord movement. The swivel connector assembly provides at least two separate and distinct rotation axes for the socket.

21 Claims, 24 Drawing Sheets

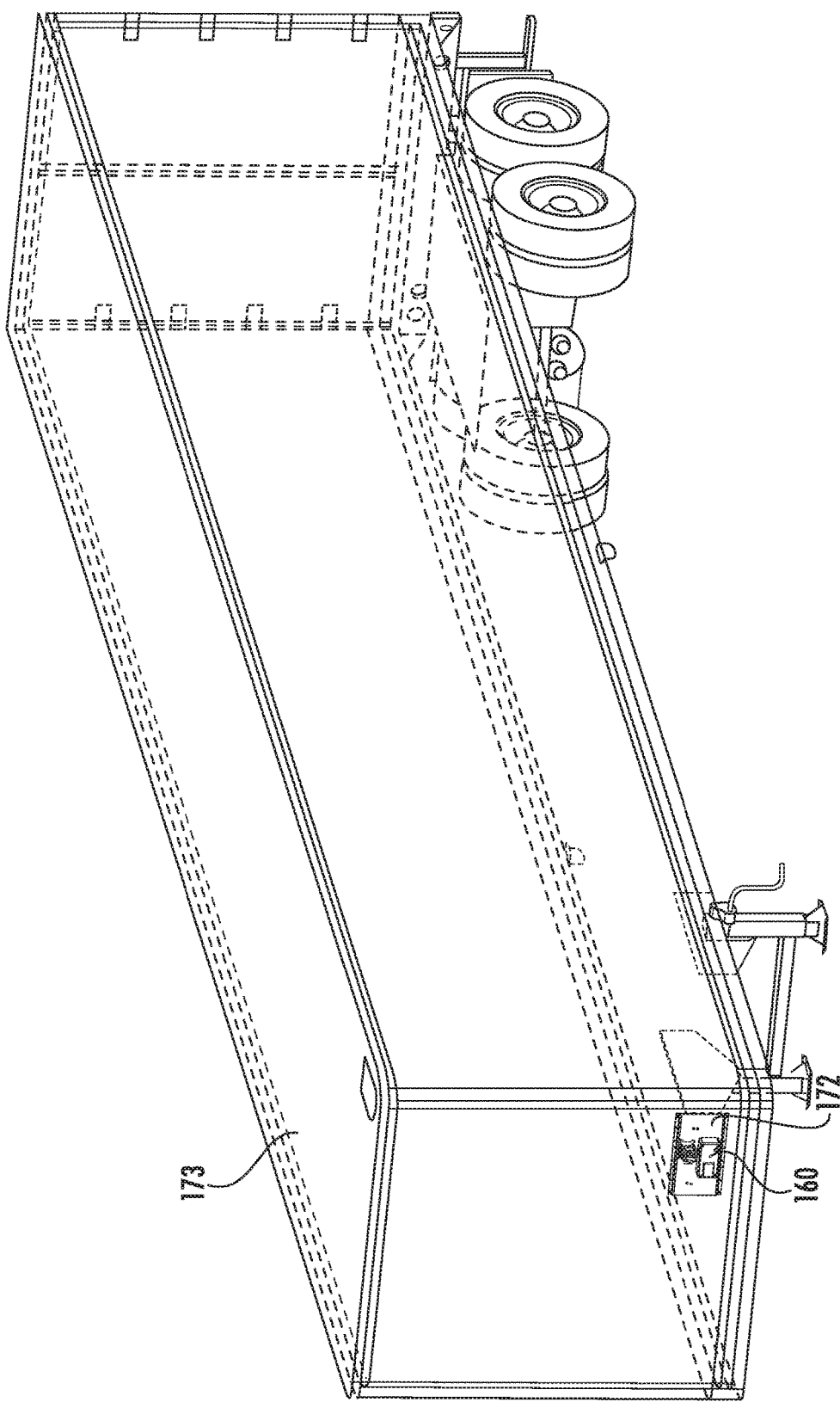

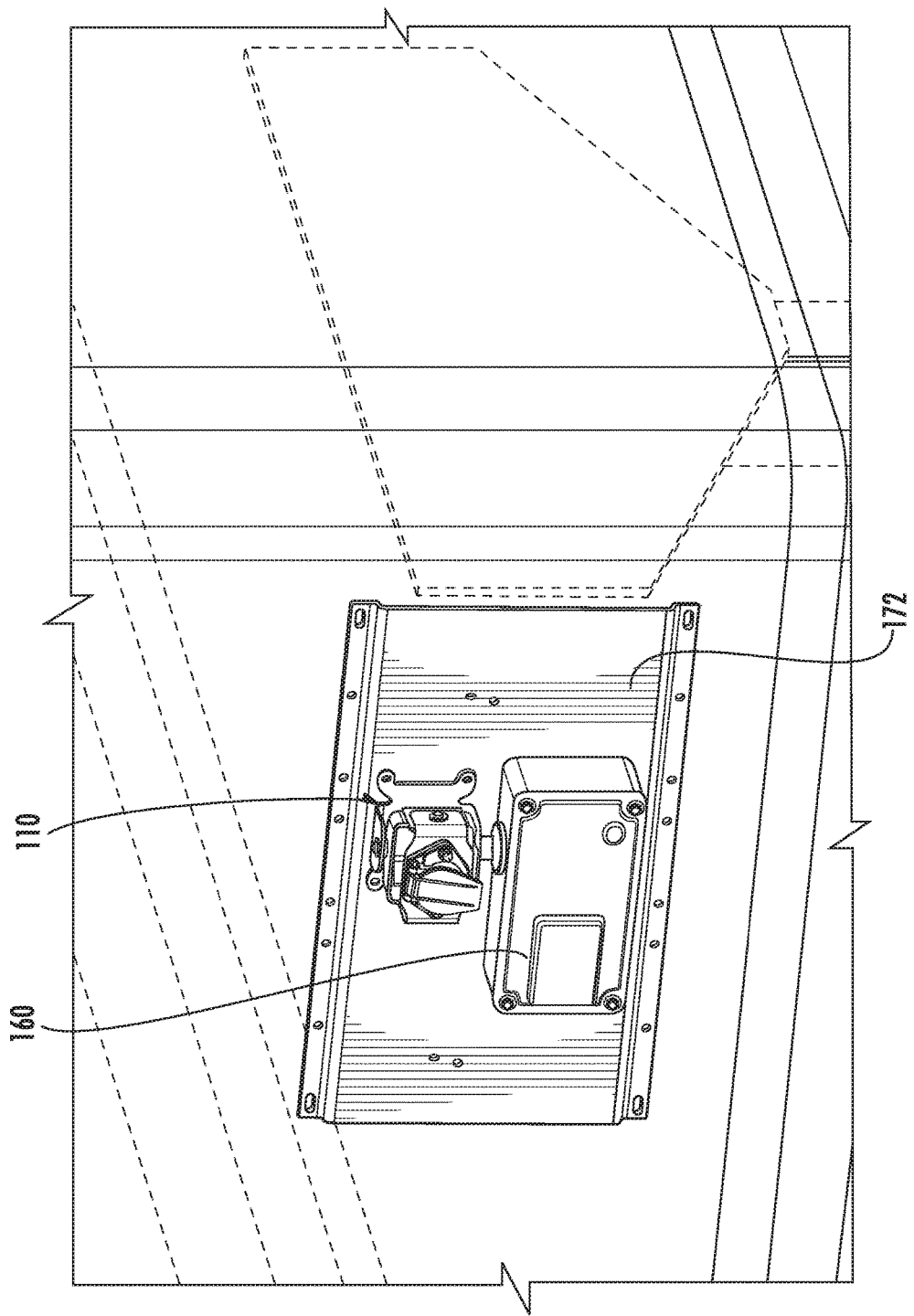

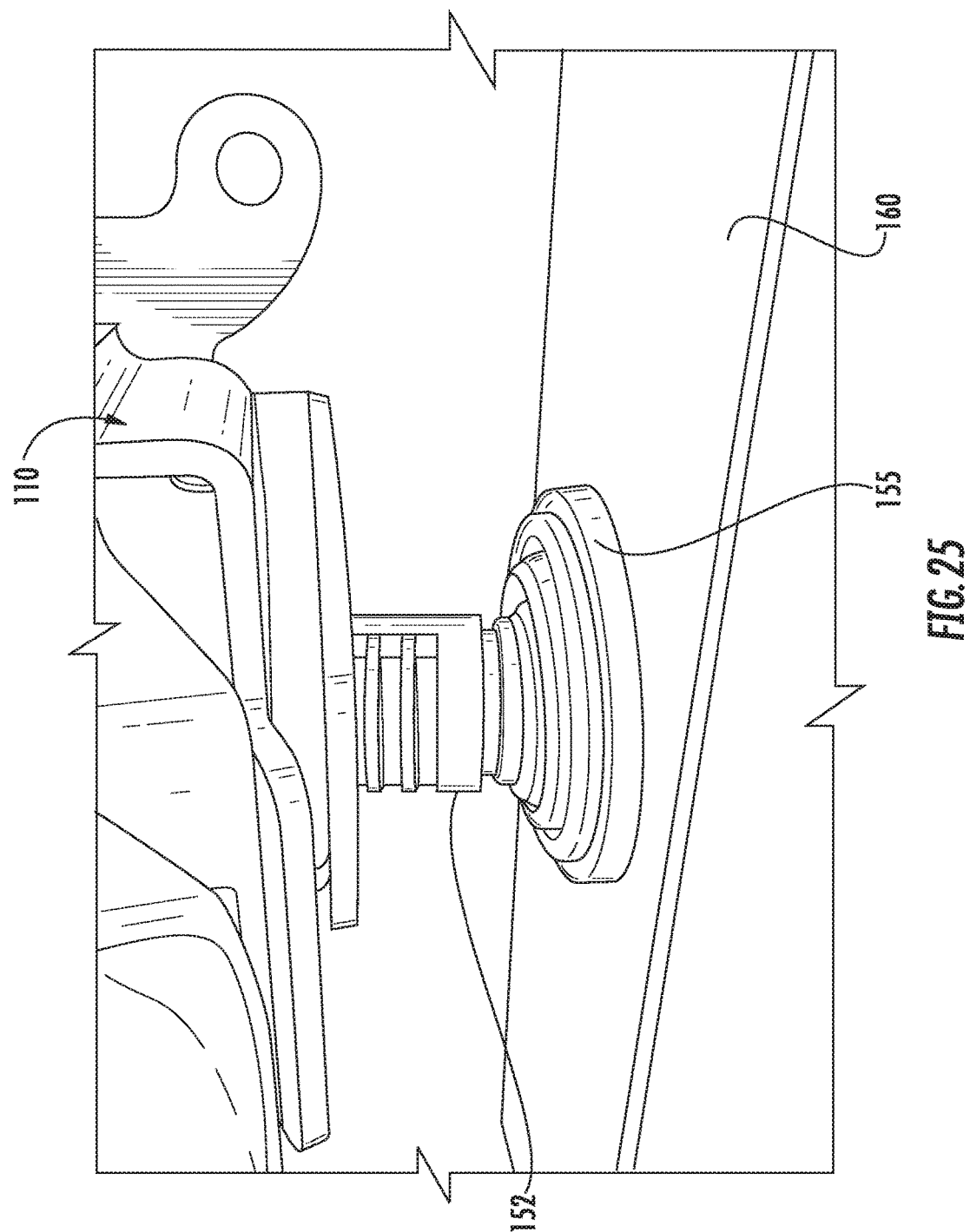

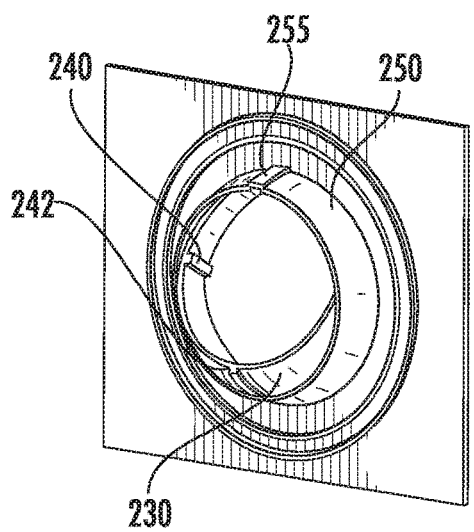
FIG.31A
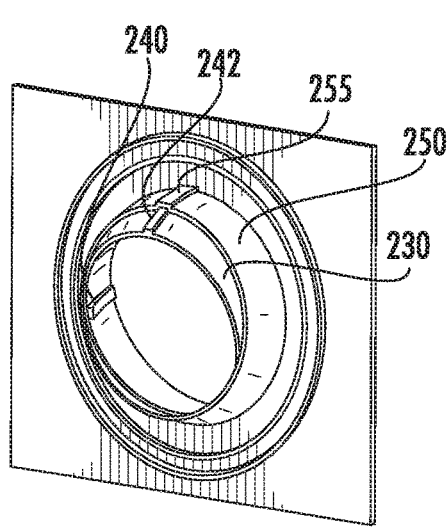
FIG.31B
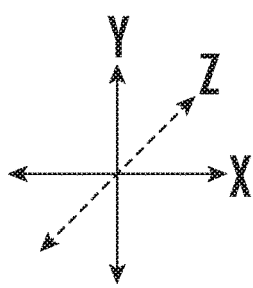
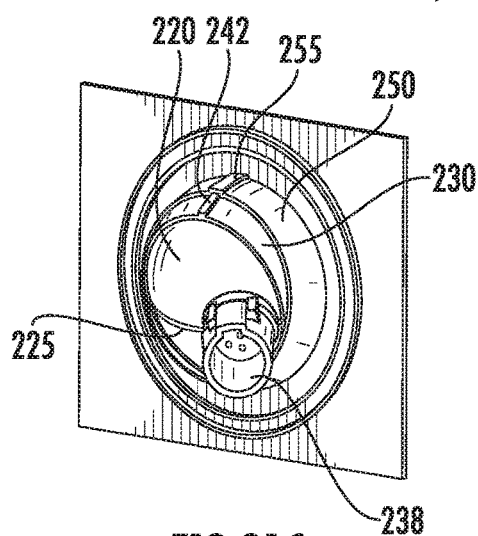
FIG.31C
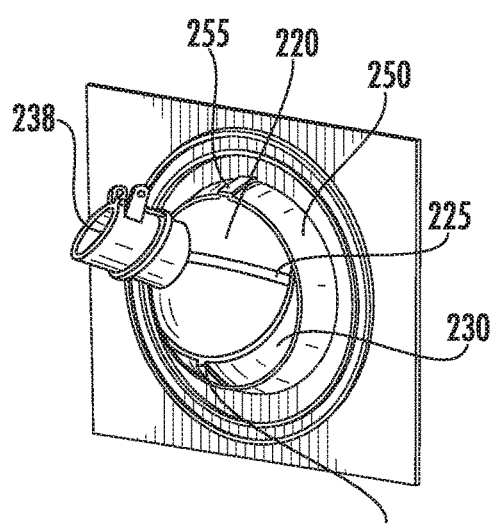
FIG.31D

SWIVEL BRACKET ASSEMBLY FOR A CONNECTOR

FIELD OF THE INVENTION

The present disclosure relates to electrical connectors that connect mobile vehicular units. More particularly, the invention relates to an electrical connector assembly for tractor-trailer vehicles to electrically connect a tractor and trailer, or any additional trailer-trailer combinations where flexibility of the electrical connections prevents damage to the cables or connectors there attached.

SUMMARY

The system of the application describes a connector assembly comprising: a base mounting member secured to a supporting structure; an intermediate member capable of rotation about at least an x-axis with respect to the base mounting member; a socket mounting member capable of securing a socket receptacle wherein the socket mounting member engages with the intermediate member to allow rotation about at least a y-axis; wherein the intermediate member couples the base mounting member and the socket mounting member to provide a non-rigid moveable socket that is configured to follow and approximate movement of attached electrical cables when acted upon by angular pull forces. In one embodiment, the x-axis is in a horizontal direction while the y-axis is in a vertical direction. In another embodiment, the x-axis is in a vertical direction while the y-axis is in a horizontal direction, or varied as so desired. The x-axis and the y-axis provide two or more axes of rotation when the socket receptacle is attached to the socket mounting member to accommodate movement of one or more electrical cords at multiple angles.

In one embodiment, the connector assembly rotates about the x-axis and/or y-axis to allow the socket receptacle at a trailer to follow and approximate movement of a tractor as the electrical cords stretch. The connector assembly may use bushings disposed between one or more of the members to serve as alignment and wear resistant features. The bushings may be formed of thermoplastic and include a central bore whereby mechanical fasteners protrude to secure the members.

One embodiment of the connector assembly is affixed to a supporting structure that is a trailer. The supporting structure may also be a chassis, a nosebox, or an adaptor plate, individually or in combination. As such, the supporting structure at the nosebox or adaptor plate comprises circuitry, switches, and terminals. In one aspect, the nosebox is mounted to the adaptor plate and affixed to a trailer or a mobile structure. The nosebox may further comprise a lights out detection system, an indicator light and a toggle switch. Further, a cable assembly is capable of being attached to the connector assembly, and including a wiring overmold that encapsulates one or more cables and wiring, and a flexible boot. The cable assembly may be a 7-conductor cable assembly. The flexible boot is water and dust resistant to protect against environmental intrusion into the nosebox assembly. In addition, the flexible boot allows movement as the receptacle socket and the cable assembly rotate along the x-axis and the y-axis.

In some embodiments, the base mounting member includes a fixed hemispherical portion, the socket mounting member is a first hemispherical portion having the socket receptacle molded or cast therein, and the intermediate member is a second hemispherical portion, and wherein the connector assembly acts as a ball and socket joint. The fixed hemispherical portion has an outer surface including a revolved rib formed therein and oriented about the first axis, the first hemispherical portion is a half sphere having an outer surface with a revolved groove formed therein and oriented about the second axis, and the second hemispherical portion has an interior surface including one or more inwardly extending ribs and an exterior surface including one or more outwardly extending ribs, wherein the inwardly and outwardly extending ribs are positioned orthogonally opposite to one another. Further, the inwardly extending ribs of the second hemispherical portion engage the revolved groove of the first hemispherical portion to allow the second hemispherical portion to rotate about a single axis relative to the first hemispherical portion and wherein the outwardly extending ribs of the second hemispherical portion engage the revolved groove of the fixed hemispherical portion.

The revolved groove of the stationary hemispherical portion is configured to prevent arbitrary rotation of the second hemispherical portion and limits rotation of the first hemispherical portion.

Thus, the first hemispherical portion rotates horizontally with respect to the second hemispherical portion, and the second hemispherical portion simultaneously rotates in a vertical direction relative to the stationary hemispherical portion, or vice versa.

The connector assembly can be configured and modified to include a compression spring and a supporting spring plate, individually or in combination, that applies a force to a stack-up of one or more of the first, second and third hemispherical portions to ensure a tight fit and permit movement along a z-axis.

Aspects described herein provide a socket receptacle including at least one electrical pin array to provide an electrical connection to one or more conductor wiring harnesses. An overmolded cable assembly may include a first end for mating to the socket receptacle and a second end having a groove formed therein for engaging a flexible boot. The overmolded cable assembly can comprise cut out portions and ribs to provide flexibility.

The swivel connector disclosed herein comprises: a first mounting member capable of being secured to a supporting structure of a trailer; an intermediate member capable of rotation about at least an x-axis with respect to the first mounting member; a socket mounting member capable of securing a socket receptacle wherein the socket mounting member engages with the intermediate member to allow rotation about at least a y-axis; wherein the intermediate member couples the base mounting bracket and the socket mounting member. In one embodiment, the x-axis and the y-axis provide two or more axes of rotation when the socket receptacle is attached to the socket mounting member to accommodate movement of one or more electrical cords. The one or more electrical cords move at multiple angles as the electrical cords stretch to follow and approximate movement of a tractor to which the trailer is attached.

The method of securing a swivel connector assembly to a supporting structure is provided. The swivel connector assembly comprises: attaching a base mounting member to the supporting structure; interconnecting an intermediate member to the base mounting member to allow rotation of the intermediate member about at least an x-axis; and engaging a socket mounting member with the intermediate member such that the socket mounting member is capable of attaching a socket receptacle to allow rotation about at least a y-axis; wherein rotation about the x-axis and the y-axis accommodates angular movement of attached electrical cords. A step of integrating a compression spring and a supporting spring plate, individually or in combination, allows the swivel connector assembly to permit movement along a z-axis. The base mounting member may therefore be non-rigidly attached to the supporting structure to accommodate movement of the swivel connector assembly along an x-axis, y-axis, and z-axis, alone or in combination. The connector assembly is capable of rotating along the x-axis and the y-axis in horizontal and vertical directions, respectively, when the removable socket receptacle is attached to the socket mounting member to accommodate movement of one or more electrical cords.

In another step of attaching the swivel connector assembly to a mobile unit and connecting the electrical cords from the tractor to the mobile unit at the swivel connector assembly, the socket receptacle rotates about the x-axis and y-axis to follow and approximate movement of a tractor as the electrical cords stretch. When one or more angular pull forces are applied to one or more electrical cords attached at the socket receptacle with the socket mounting member, the non-rigid moveable socket flexibly follows movement of attached electrical cables when acted upon by the angular pull forces.

Embodiments thus being described may be modified and reconfigured, as desired, to accomplish similar function and capabilities. In one aspect the connector can be utilized at an adaptor plate of the tractor or at an adaptor plate of the trailer, alone or in combination with other connectors.

BRIEF DESCRIPTION OF THE DRAWINGS

FIGS. 23 and 24A, 24B, 24C illustrate the swivel connector of FIG. 10 connected to a nosebox assembly attached to a vehicle trailer.

FIG. 25 is a detailed view of an overmolded cable and a flexible boot connecting the swivel connector of FIG. 10 and the nosebox assembly.

FIGS. 31A and 31B illustrate the rotation of the second hemispherical portion in a vertical direction relative to fixed the hemispherical portion.

FIGS. 31C and 31D illustrate the horizontal rotation of the first hemispherical portion with respect to the second hemispherical portion as well as the simultaneous rotation of the second hemispherical portion in a vertical direction relative to the fixed hemispherical portion.

DETAILED DESCRIPTION

Figure 1:
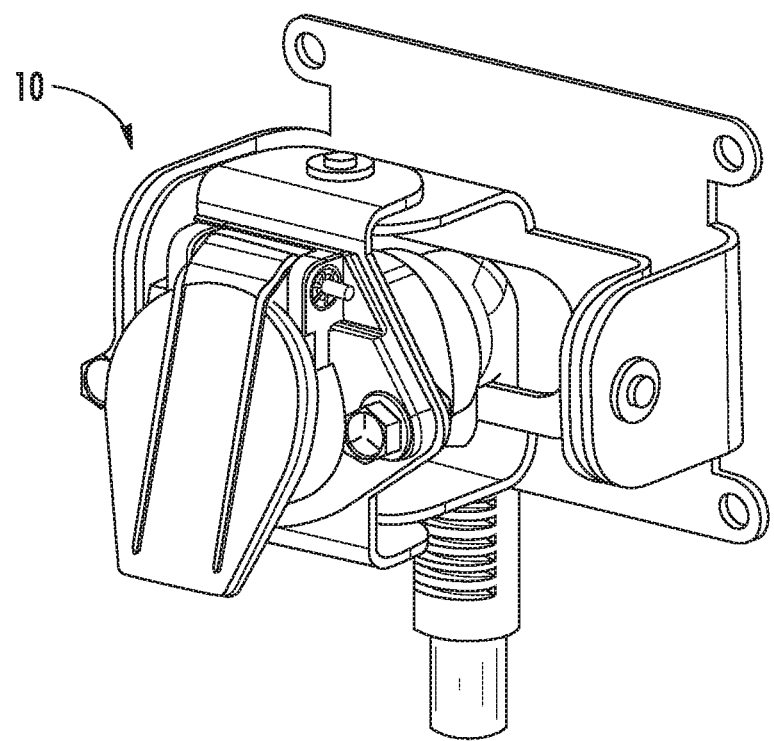
FIG. 1 illustrates a first embodiment of a swivel connector including three brackets.

FIG. 1 illustrates a first embodiment of a swivel connector 10, a connection interface from a tractor power unit 7-conductor electrical cord, and a trailer SAE.J560 receptacle socket. The Society of Automotive Engineers standard document SAE J560 requires the socket to withstand an angular pull force of 667N (1501b) at an angle of 60 degrees for a duration of 24 hours at 25° C. without mechanical damage or loss of electrical continuity. Repeated angular pull forces on the connection through field-use can result in loss of electrical continuity and premature socket failure. The swivel connector is non-rigid, movable SAE J560 socket to reduce stress on the connection interface when the tractor makes a turn. The axis of the socket would follow and approximate the axis of the tractor as the electrical cord stretches. The swivel connector assembly provides more than a single axis of rotation to accommodate multiple angles of cord movement.

Figure 2:
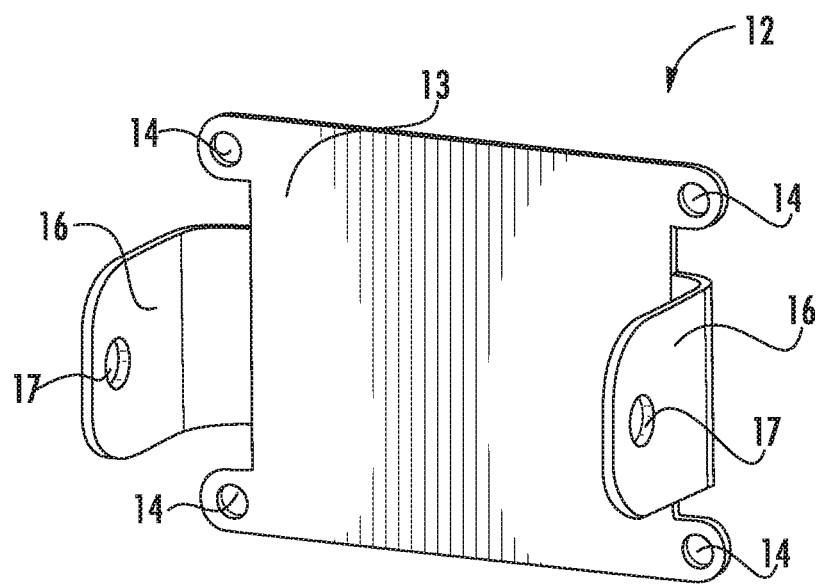
FIG. 2 is base mounting bracket of the swivel connector of FIG. 1.

Swivel connector assembly 10 provides two separate and distinct rotation axes for a SAE J560 socket. Swivel connector 10 may be manufactured from formed steel sheet stock, die-cast aluminum or zinc, or molded thermoplastic materials. Swivel connector 10 includes a base mounting bracket 12 that mounts to a supporting structure of a trailer or chassis, a nosebox, or an adapter mounting plate. As shown in FIG. 2, base mounting bracket 12 includes a face 13 with a series of mounting apertures 14 to mechanically attach swivel connector assembly 10 to the supporting mounting structure via fasteners, such as bolts or rivets. Base mounting bracket 12 also includes inwardly extending mounting tabs 16 for engaging an intermediate bracket 18. Each of mounting tabs 16 includes a hole 17 formed therein to allow rotation about a horizontal axis.

Figure 3:
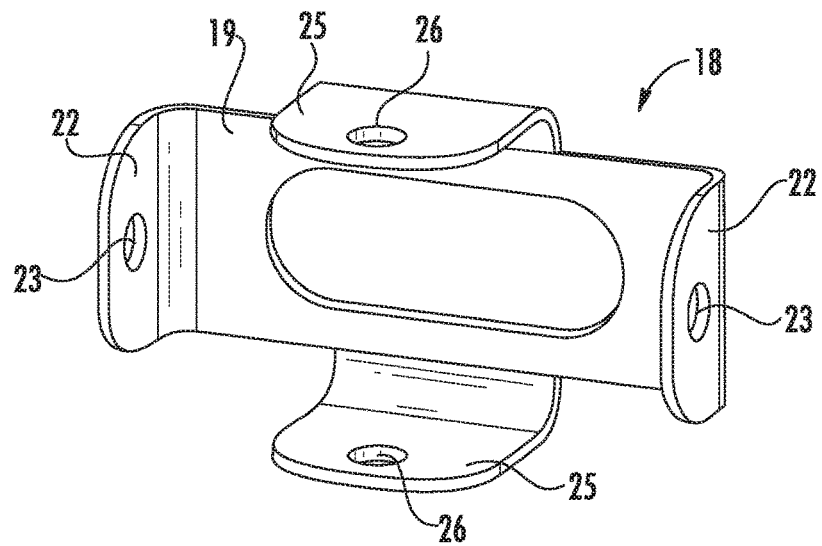
FIG. 3 is an intermediate bracket of the swivel connector of FIG. 1.
Figure 4A:
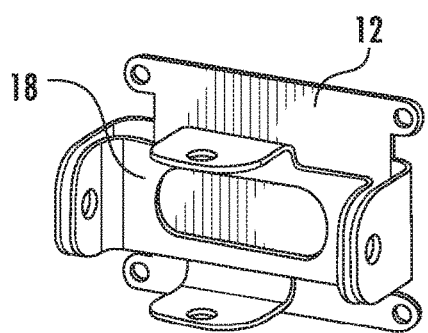
FIGS. 4A-4C illustrated the rotation of intermediate bracket with respect to base mounting bracket.
Figure 4B:
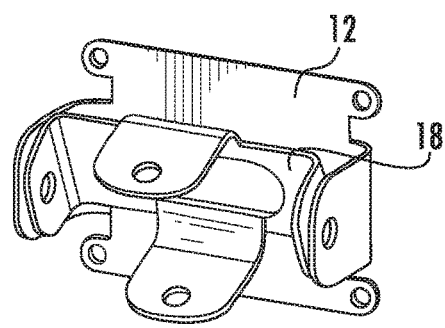
Figure 4C:
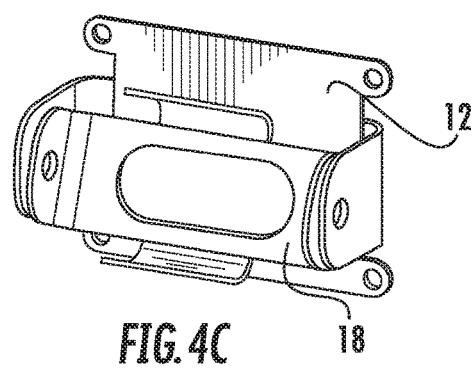
Figure 5:
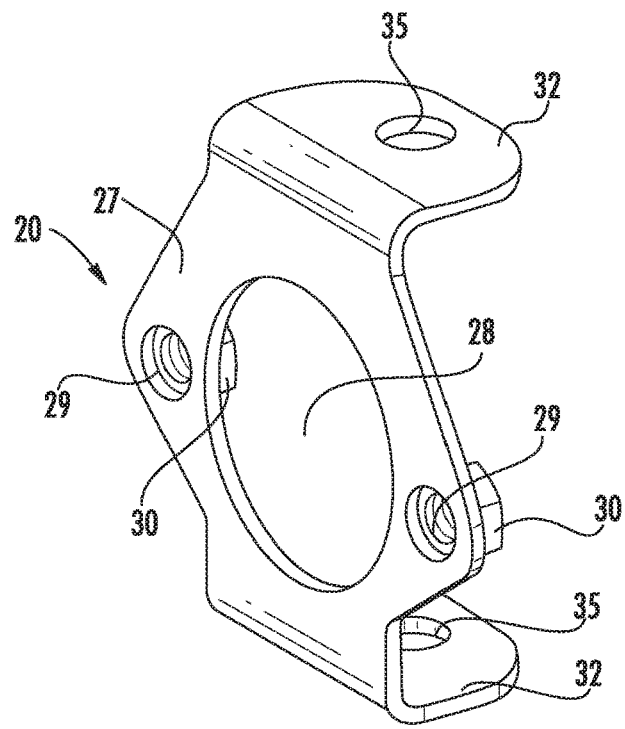
FIG. 5 is a socket mounting bracket of the swivel connector of FIG. 1.

Intermediate bracket 18, as shown in FIG. 3, functions as an intermediate for coupling base mounting bracket 12 and a socket mounting bracket 20 (See FIG. 5). Intermediate bracket 18 includes a face 19 and two sets of mounting tabs to engage base mounting bracket 12 and socket mounting bracket 20. Intermediate bracket 18 includes a first set of mounting tabs 22 with apertures 23 for engaging base mounting bracket 12 to allow rotation about the horizontal axis. A second set of mounting tabs 25 include apertures 26 and engage socket mounting bracket 20 to allow rotation about the vertical axis. The rotation of intermediate bracket 18 with respect to base mounting bracket 12 is shown in FIGS. 4A-4C.

Figure 6:
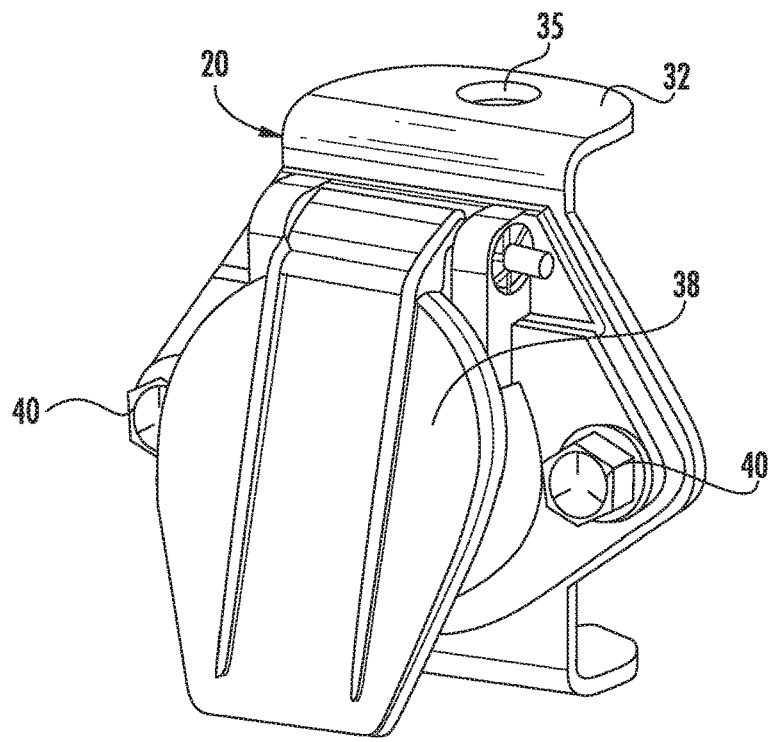
FIG. 6 illustrates the socket mounting bracket with a SAE J560 socket receptacle attached.

Socket mounting bracket 20 functions as the mounting plate for a SAE J560 receptacle socket. As illustrated in FIG. 5, socket mounting bracket 20 includes a face 27 having an opening 28 formed therein. Face 27 also includes mounting holes 29 with weld nuts 30 attached thereto to allow the SAE J560 receptacle to be secured with threaded fasteners (not shown). Socket mounting bracket 20 also includes backward extending mounting tabs 32 with apertures 35 formed therein to engage intermediate bracket 18 and allow rotation about a generally vertical axis. FIG. 6 illustrates socket mounting bracket 20 with a SAE J560 socket receptacle 38 attached with mounting fasteners 40.

Figure 7:
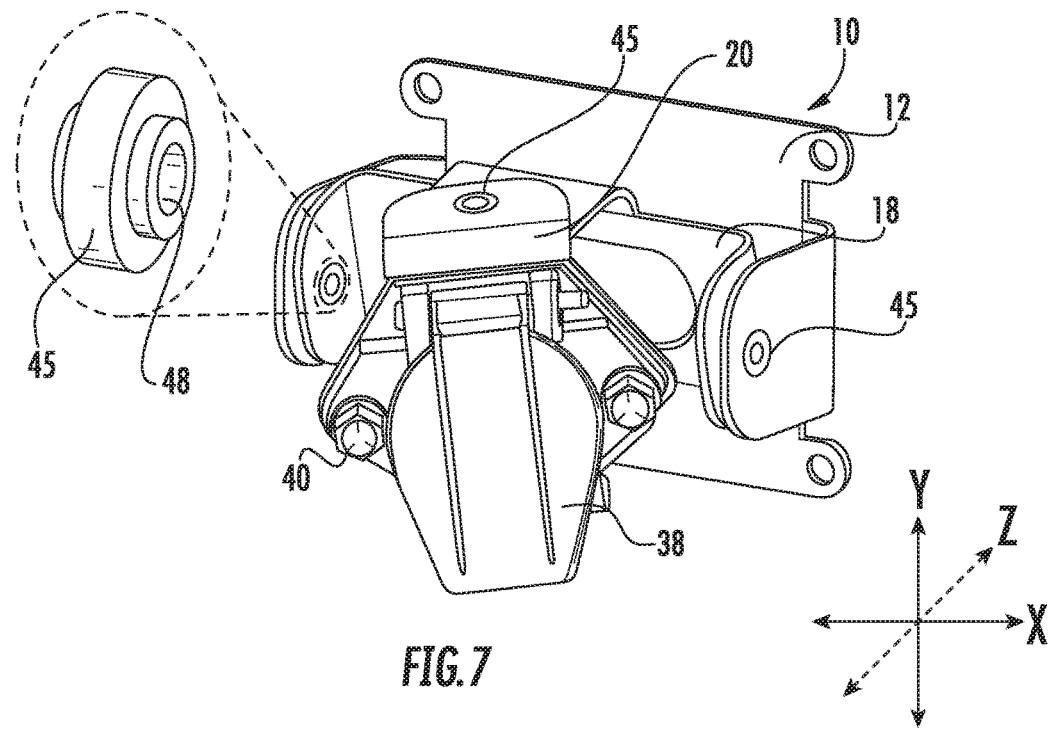
FIGS. 7-9 illustrate the swivel connector assembly in an assembled position.
Figure 8:
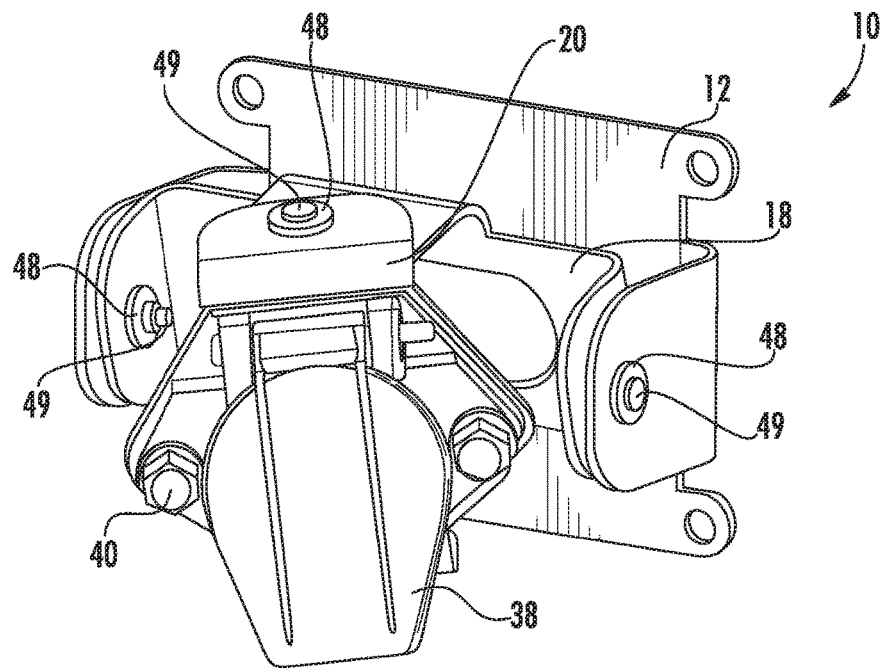
Figure 9:
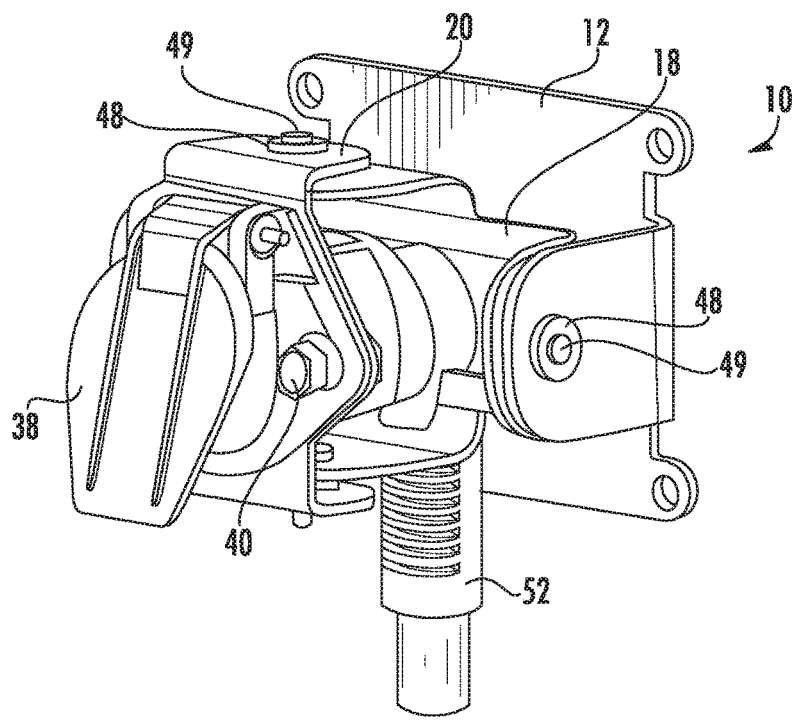

FIG. 7 illustrates swivel connector assembly 10 in an assembled position with socket mounting bracket 20 rotated horizontally along an x-axis. Bushings 45 are disposed between adjacent tabs of the brackets to serve as alignment and wear resistant features. Bushings 45 may be formed of thermoplastic and include a central bore 48 whereby mechanical fasteners protrude to secure swivel connector assembly 10. Washers and pins are provided to further secure swivel connector assembly 10, as shown in FIG. 8. An overmolded cable 52 is also provided as shown in FIG. 9.

Figure 10:
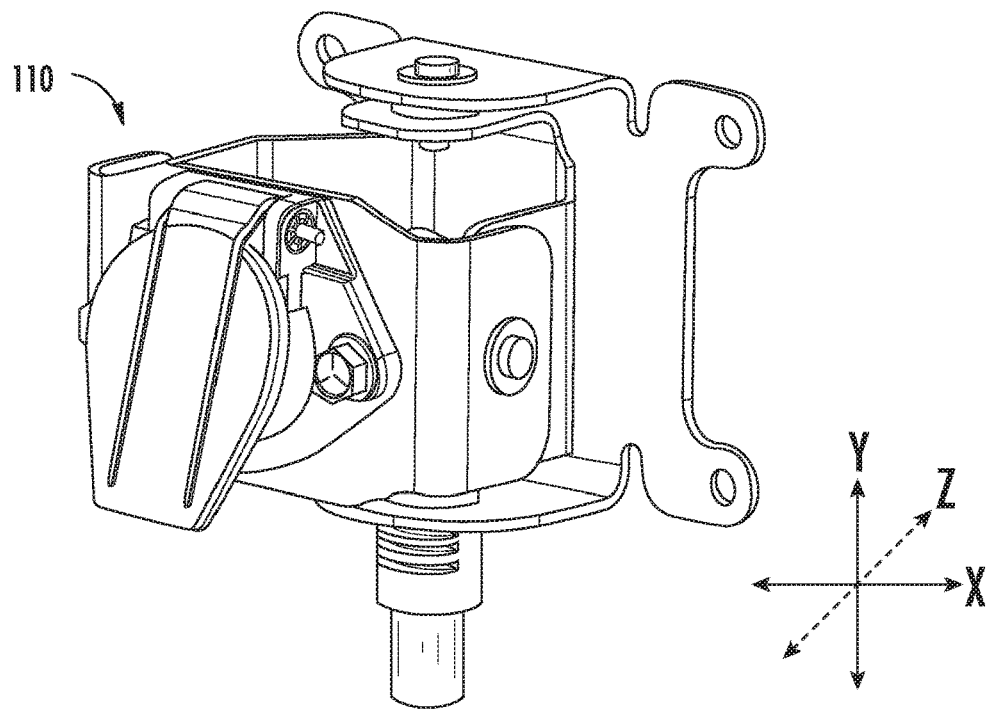
FIG. 10 illustrates an additional embodiment of a swivel connector assembly.
Figure 11:
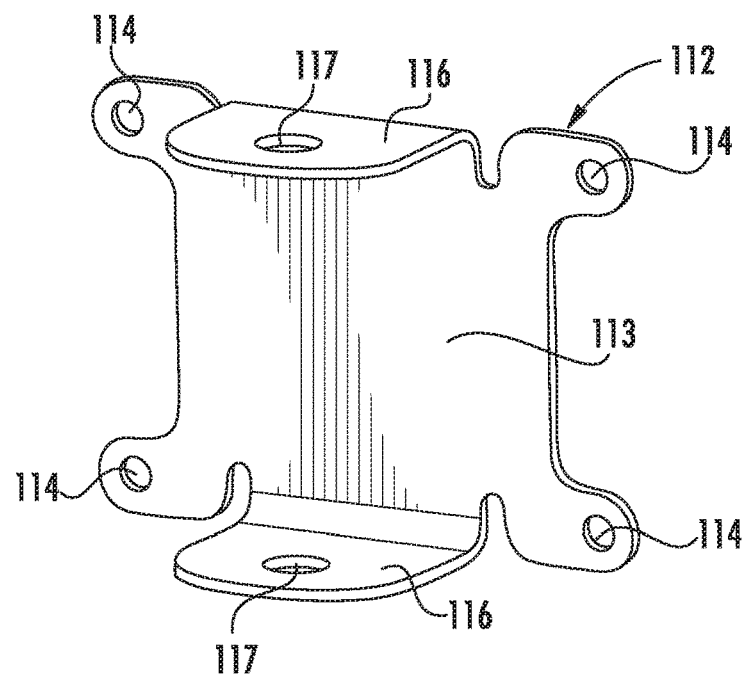
FIG. 11 is base mounting bracket of the swivel container of FIG. 10.

FIG. 10 illustrates an additional embodiment of a swivel connector assembly 110 that provides two separate and distinct rotation axes for a SAE J560 socket. Swivel connector 110 includes a base mounting bracket 112 that mounts to a supporting structure of a trailer or chassis, a nosebox, or an adapter mounting plate. As shown in FIG. 11, base mounting bracket 112 includes a face 113 with a series of mounting apertures 114 to mechanically attach swivel connector assembly 110 to the supporting mounting structure via fasteners, such as bolts or rivets. Base mounting bracket 112 also includes inwardly extending mounting tabs 116 for engaging an intermediate bracket 118. Each of mounting tabs 116 includes a hole 117 formed therein to allow rotation about a vertical axis.

Figure 12:
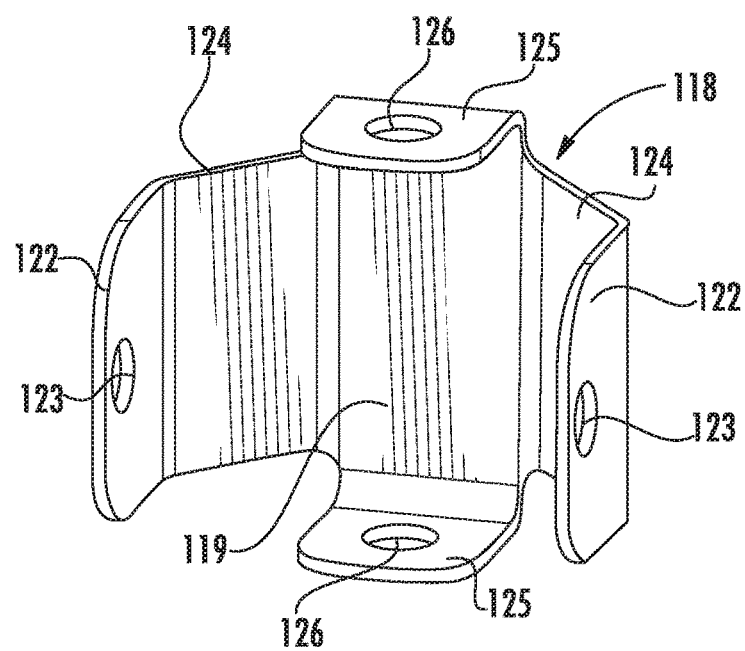
FIG. 12 is an intermediate bracket of the swivel container of FIG. 10.
Figure 13A:
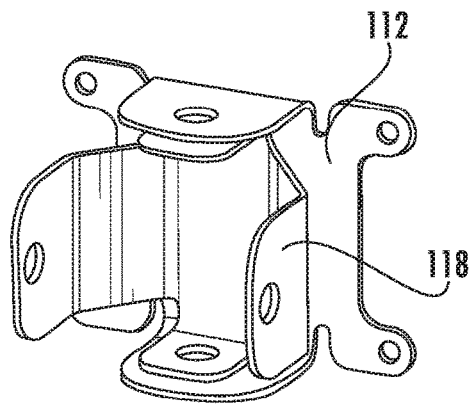
FIGS. 13A-13C illustrates the rotation of intermediate bracket with respect to base mounting bracket.
Figure 13B:
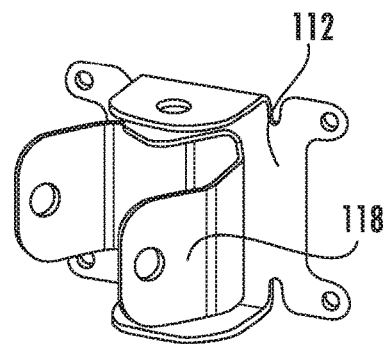
Figure 13C:
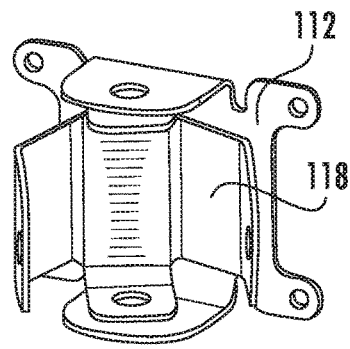

Intermediate bracket 118, as shown in FIG. 12, functions as an intermediate for coupling base mounting bracket 112 and a socket mounting bracket 120. Intermediate bracket 118 includes a face 119 and two sets of mounting tabs to engage base mounting bracket 112 and socket mounting bracket 120. Intermediate bracket 118 includes a first set of mounting tabs 122 with apertures 123 for engaging base mounting bracket 112 to allow rotation about the horizontal axis. Mounting tabs 122 include inwardly angled portions 124. Together, face 119, angled portions 124 and tabs 122 form a generally C-shaped configuration. A second set of mounting tabs 125 include apertures 126 and engage socket mounting bracket 120 to allow rotation about the vertical axis, along a y-axis. The rotation of intermediate bracket 118 with respect to base mounting bracket 112 is shown in FIGS. 13A-13C.

Figure 14:
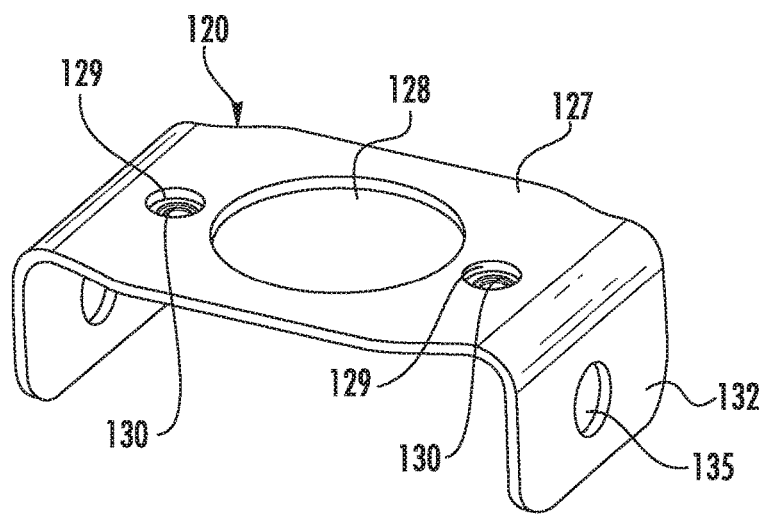
FIG. 14 is a socket mounting bracket of the swivel connector of FIG. 10.
Figure 15:
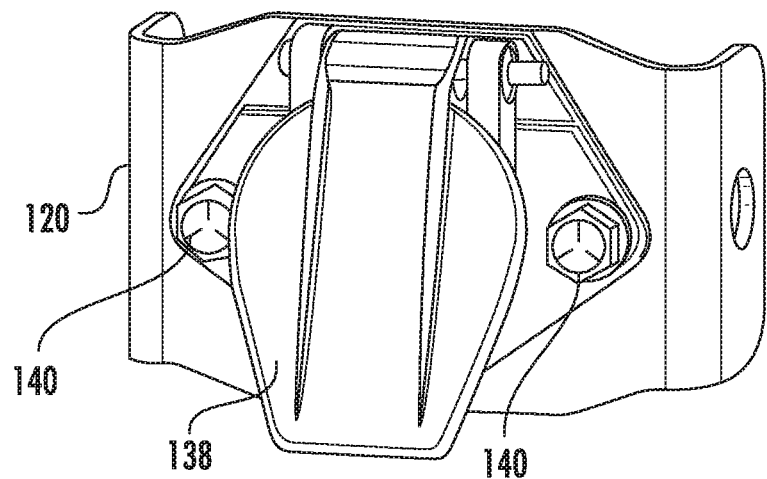
FIG. 15 illustrates the socket mounting bracket with a SAE J560 socket receptacle attached.

Socket mounting bracket 120 functions as the mounting plate for a SAE J560 receptacle socket. As illustrated in FIG. 14, socket mounting bracket 120 includes a face 127 having an opening 128 formed therein. Face 127 also includes mounting holes 129 with weld nuts 130 attached thereto to allow a SAE J560 receptacle to be secured with threaded fasteners (not shown). Socket mounting bracket 120 also includes backward extending mounting tabs 132 with apertures 135 formed therein to engage intermediate bracket 118 and allow rotation about a generally vertical axis. FIG. 15 illustrates socket mounting bracket 120 with a SAE J560 socket receptacle 138 attached with mounting fasteners 140.

Figure 16:
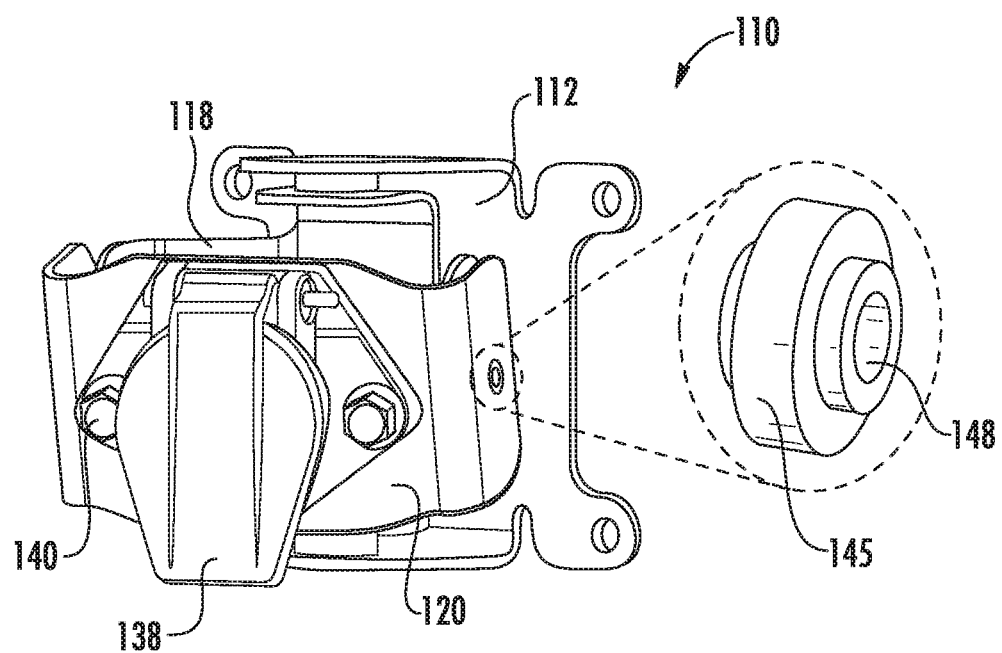
FIGS. 16-18 illustrate the swivel connector assembly of FIG. 10 in an assembled configuration.
Figure 17:
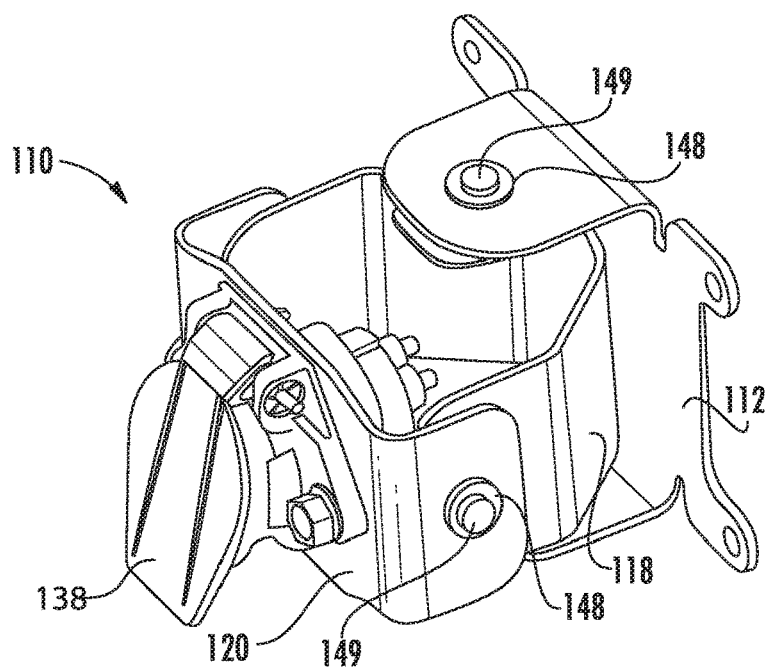

FIG. 16 illustrates swivel connector assembly 110 in an assembled configuration. Bushings 145 are disposed between adjacent tabs of the brackets to serve as alignment and wear resistant features. Bushings 145 may be formed of thermoplastic and include a central bore 148 whereby mechanical fasteners protrude to secure swivel connector assembly 110. Washers 148 and 149 pins are provided to further secure swivel connector assembly 10, as shown in FIG. 17.

Figure 18:
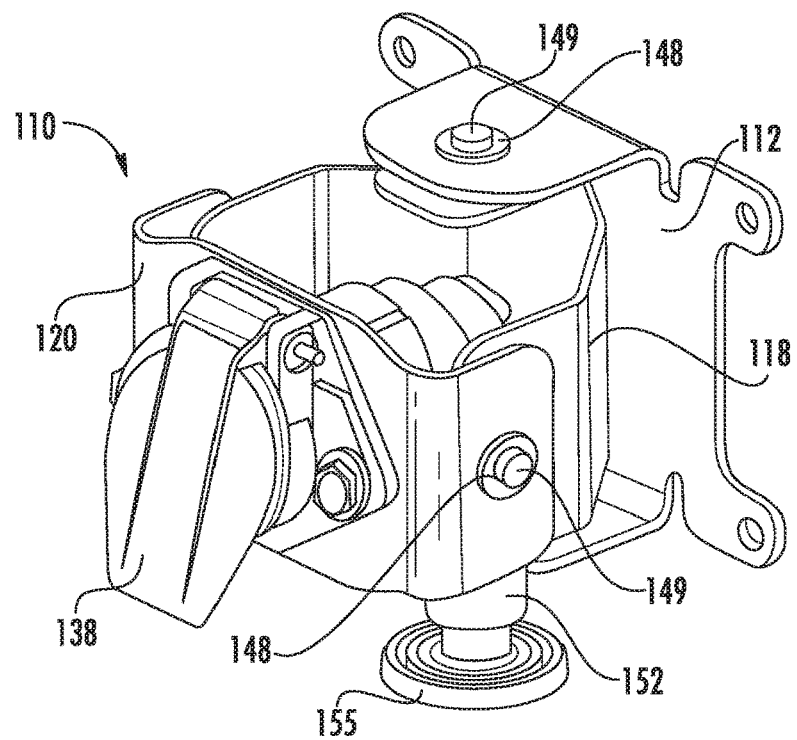
Figure 19:
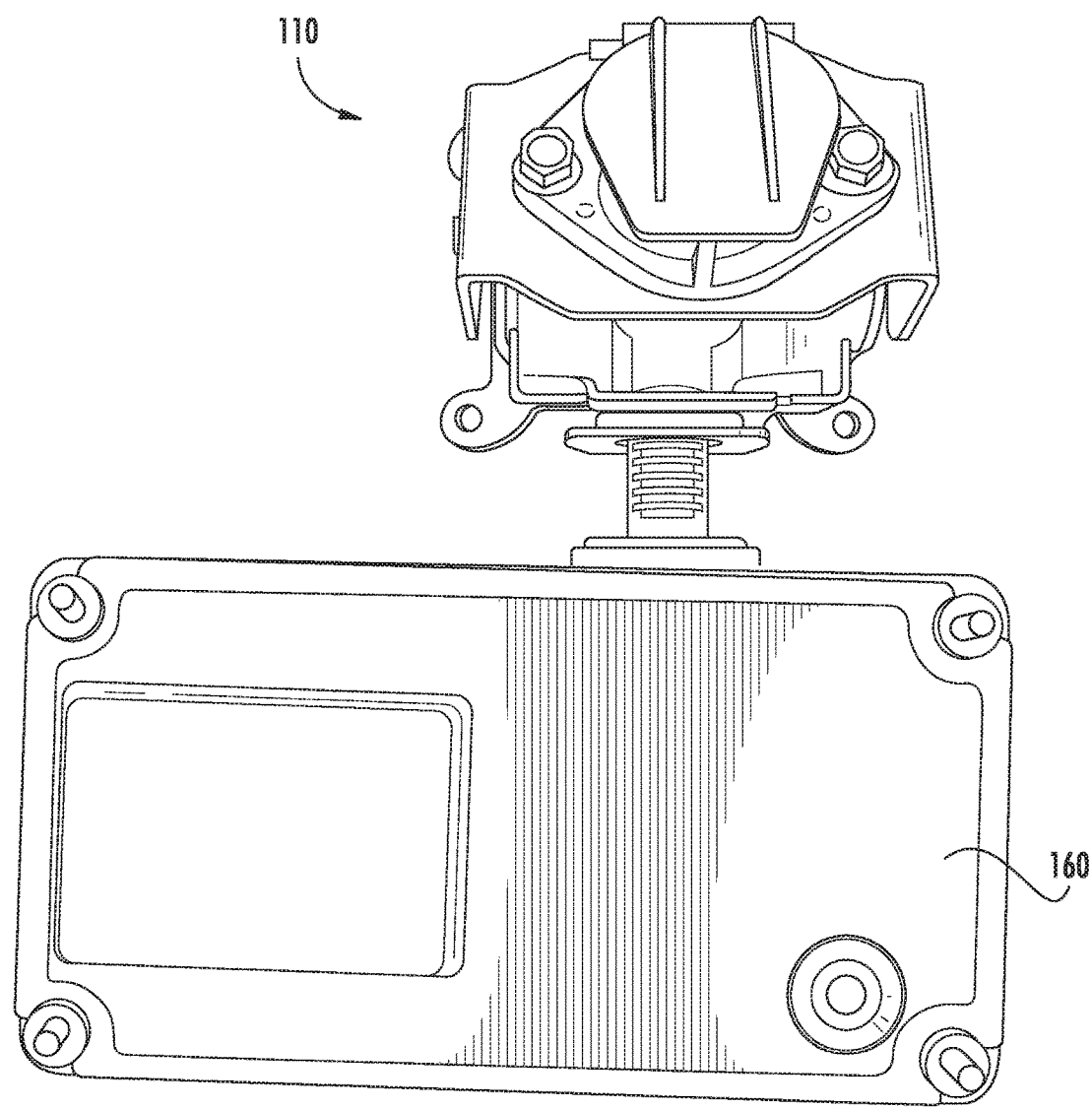
FIG. 19 illustrates the swivel connector of FIG. 10 connected to a nosebox assembly in a horizontal configuration.
Figure 20:
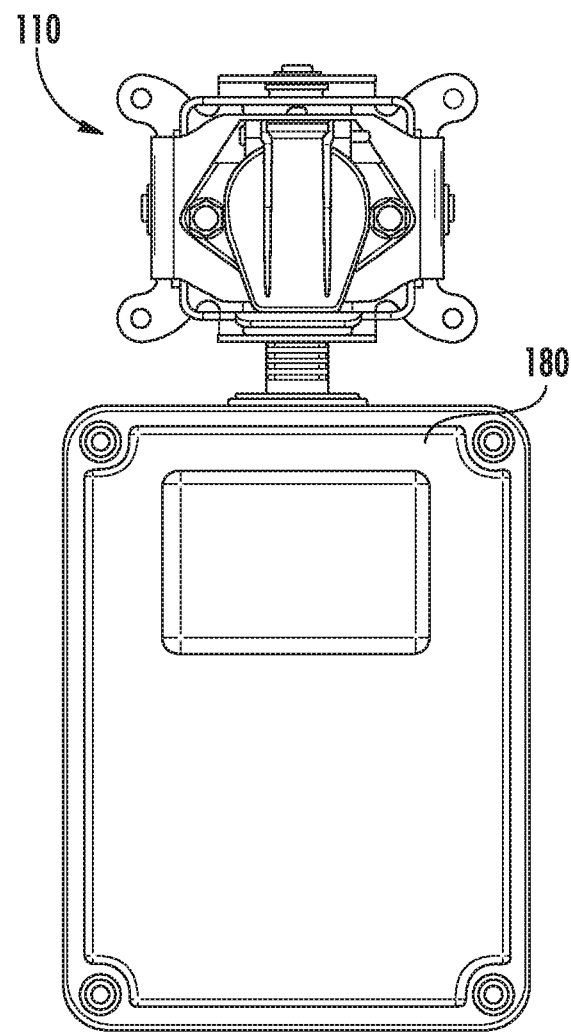
FIG. 20 illustrates the swivel connector of FIG. 10 connected to a nosebox assembly in a vertical configuration.

A wiring overmold 152 and flexible boot 155 is also provided as shown in FIG. 18. Flexible thermoplastic elastomer boot 155 is also provided to serve as a water and dust resistant interface material for protecting the otherwise un-sealed interface of a cable entering a nosebox enclosure. Boot 155 may have additional sealants applied around the bore of the cable body and around the base interface to a stationary mounting structure, such as the nosebox enclosure. Boot 155 is formed of a thin-walled flexible material that stretches during movement of swivel connector assembly 110 and subsequent movement of the cable.

FIGS. 19-25 will be described with reference to swivel connector assembly 110. However, it will be understood by one skilled in the art that the following description also applies to other embodiments of the swivel connector assembly, such as assembly 10. Swivel connector assembly 110 is shown attached to a nosebox 160. Nosebox 160 typically includes at least circuitry, switches, and terminals. In some embodiments, nosebox 160 includes a light out detection system and also includes an indicator light and toggle switch.

Figure 21:
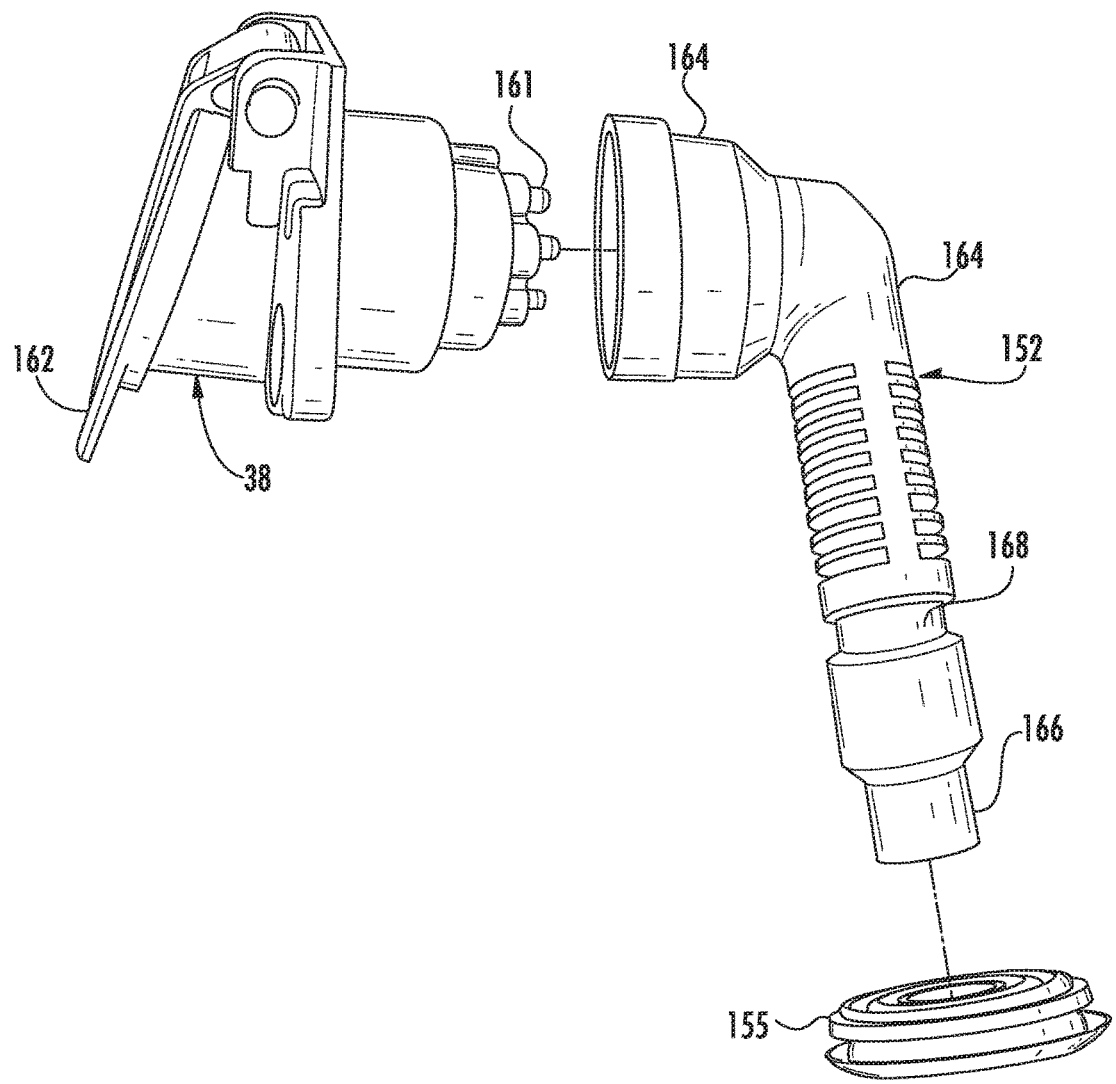
FIGS. 21 and 22 illustrate a socket receptacle and overmolded cable.
Figure 22:
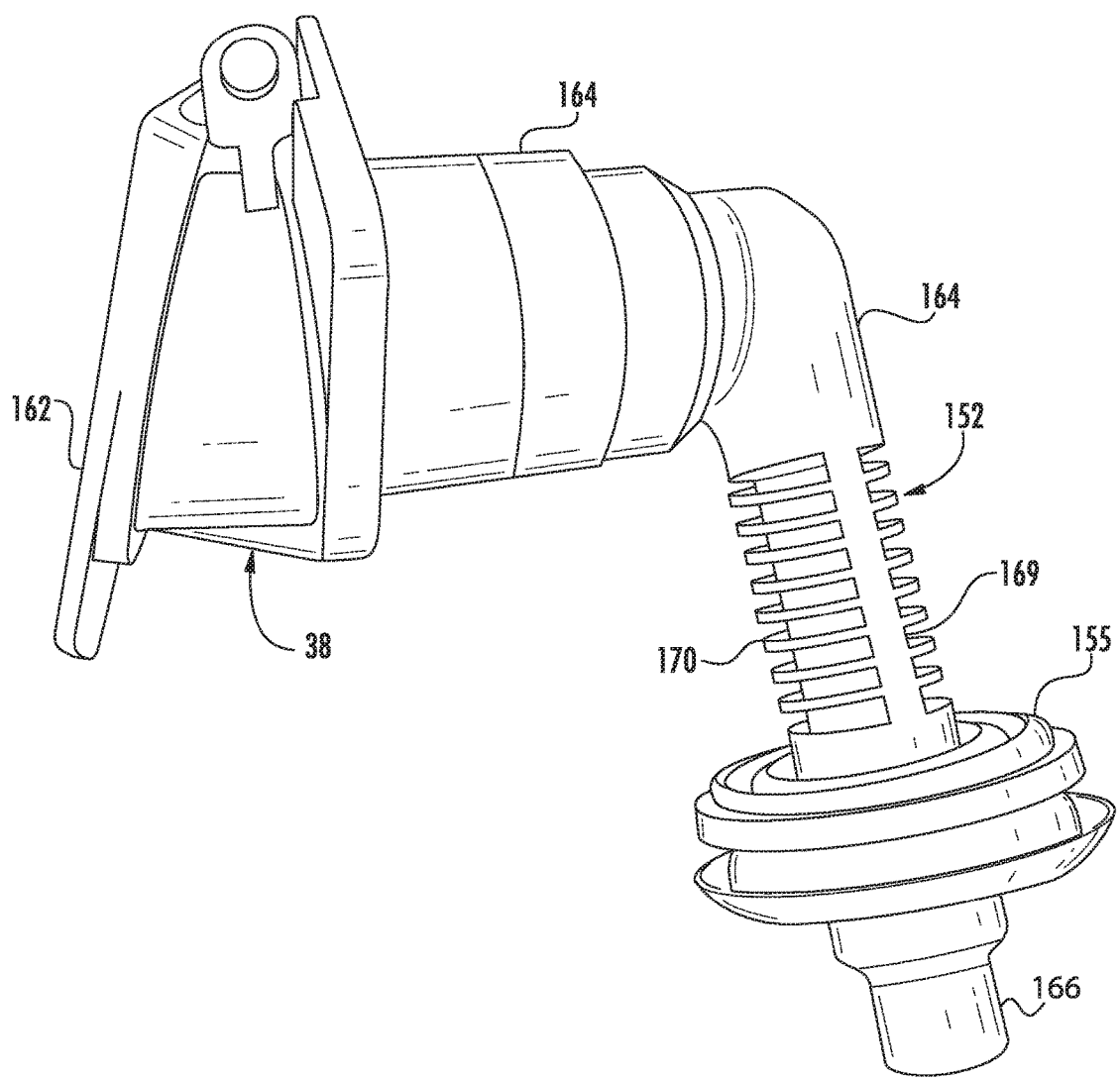

As shown in FIGS. 21-22, socket receptacle 38 is a SAE J560 socket for a Seven Conductor Electrical Connector for Truck-Trailer. As is known in the art SAE standard J560 provides requirements for seven pin electrical connectors for heavy duty vehicles. Socket receptacle 38 that meets SAE standard J560 includes an interior electrical connector pin array 161 to provide an electrical connection to a seven-conductor wiring harness and an additional electrical connector array (not shown) behind cover 162. An overmolded 7-conductor cable assembly 152 has a first end 164 for mating to socket receptacle 38 and a second end 166 having a groove 168 formed therein for engaging flexible boot 155. Overmold 152 also includes cut out portions 169 and ribs 170 for increasing flexibility of cable assembly 152. Socket receptacle 38, overmold 152 and flexible boot 155 are shown in an assembled configuration in FIG. 22. In particular, the overmolded 7-conductor cable assembly 152 plugs into the back of the socket 38 in the upper structure and extends downward through the flexible seal boot 155 into the nosebox assembly 160. The flexible seal boot 155 allows movement as the socket 38 and cable assembly 152 rotates (left/right & up/down) and provides environmental protection against water intrusion into nosebox 160.

Figure 24C:
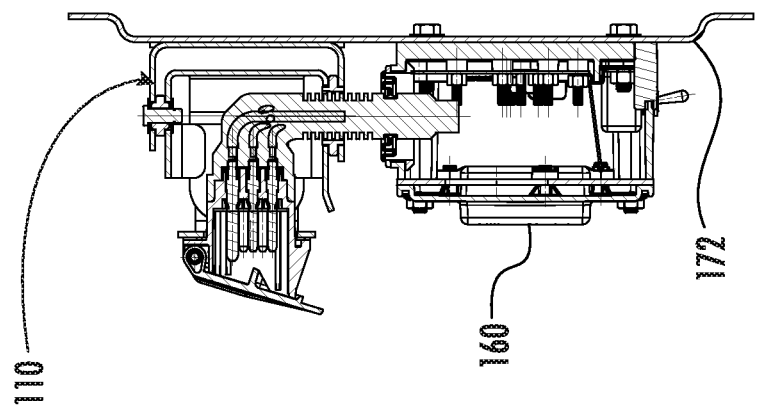
Figure 24B:
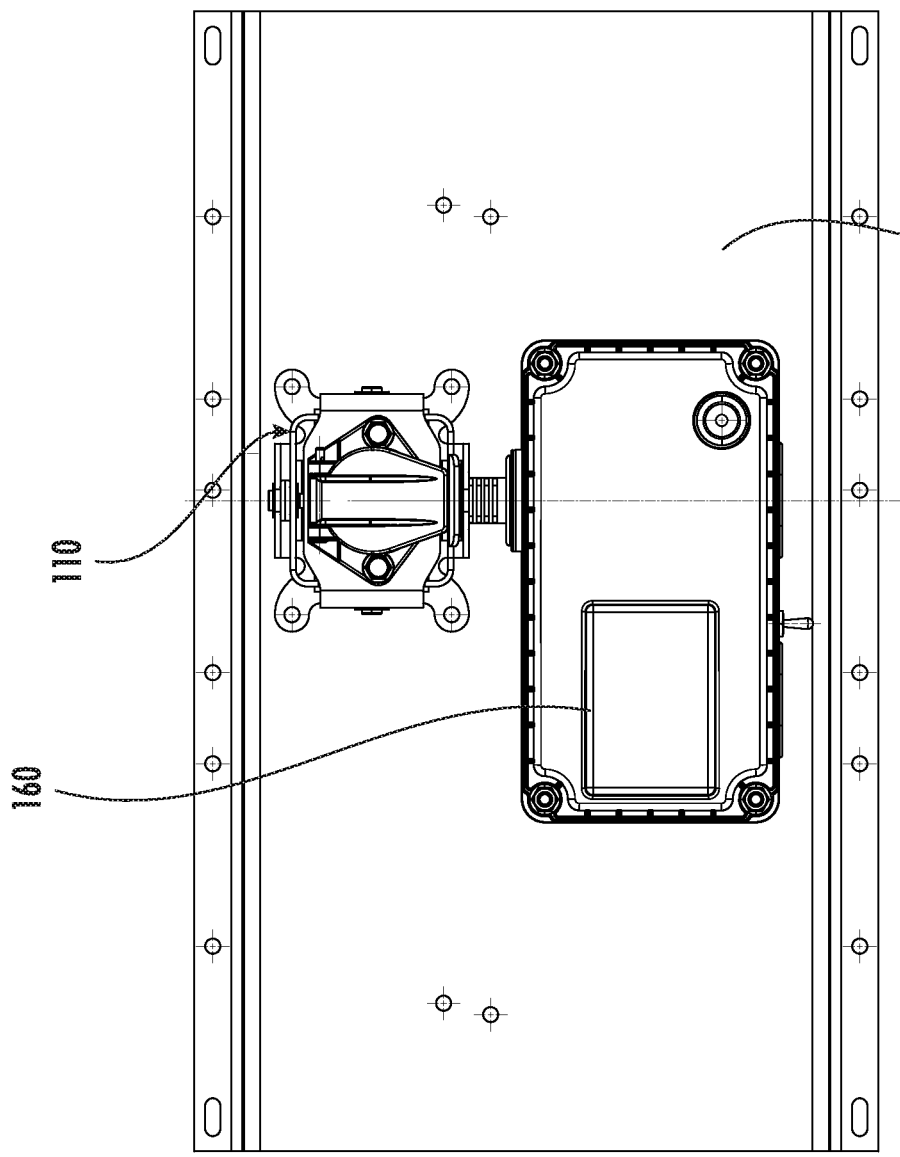

As shown in FIGS. 23-25, nosebox 160 is typically mounted to an adapter plate 172 which can be bolted or riveted to the frame structure of a trailer 173. FIG. 23 shows a perspective view of a trailer 173 having nosebox 160 and swivel connector 110 mounted to adapter plate 172. FIG. 24A is a more detailed view of nosebox 160 and swivel connector 110 mounted to adapter plate 172. FIG. 24B are front and cross-sectional views of nosebox 160 and swivel connector 110 mounted to adapter plate 172. FIG. 25 is a detailed view of overmold 152 and flexible boot 155 connecting swivel connector 110 and nosebox 160. Nosebox 160 is rigidly mounted to metal adapter plate 172 and metal adapter plate 172 is rigidly mounted to trailer frame structure. When sharp turns are made, coiled cords (not shown) that connect the tractor to trailer 173 stretch, which adds stress on the socket interface. Swivel connecter 110 allows rotation in the vertical and horizontal axes to reduce stress on the electrical connector.

Figure 26:
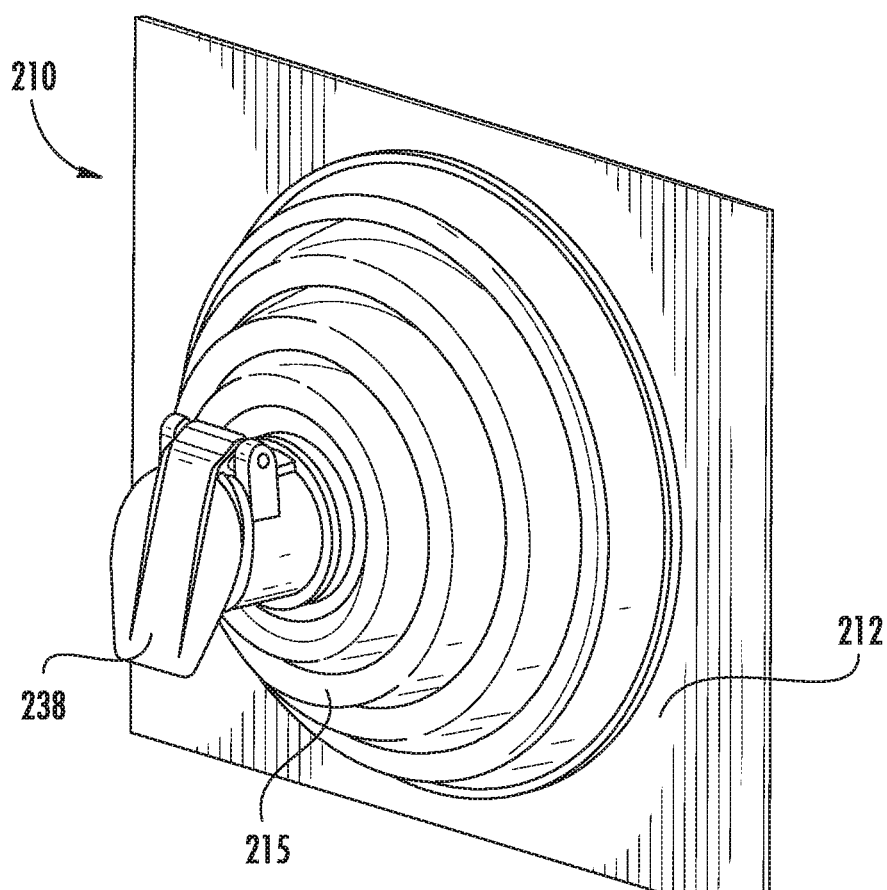
FIG. 26 is a perspective view of another embodiment of a swivel connector including three hemispherical shaped members.

An additional embodiment of a swivel connector 210 is shown in FIGS. 26-34. FIG. 26 is a perspective view of swivel connector 210 in an assembled configuration. Swivel connector 210 includes three hemispherical shaped members to provide two separate rotation axes of a SAE J560 receptacle 238 relative to a rigid mounting support structure 212. The hemispherical portions replicate a ball and socket joint and are covered by a flexible boot 215 formed from a thermoplastic elastomer. The hemispherical shaped members can be formed of thermoplastic, cast aluminum, or zinc materials. Flexible boot 215 serves as a water and dust resistant interface material to protect the otherwise un-sealed interface of the hemispherical portions. The boot may have secondary applied sealants around the bore of the connector body and around the base interface to the stationary mounting structure. The thin-walled flexible material will stretch during actuation of the connector body.

Figure 27:
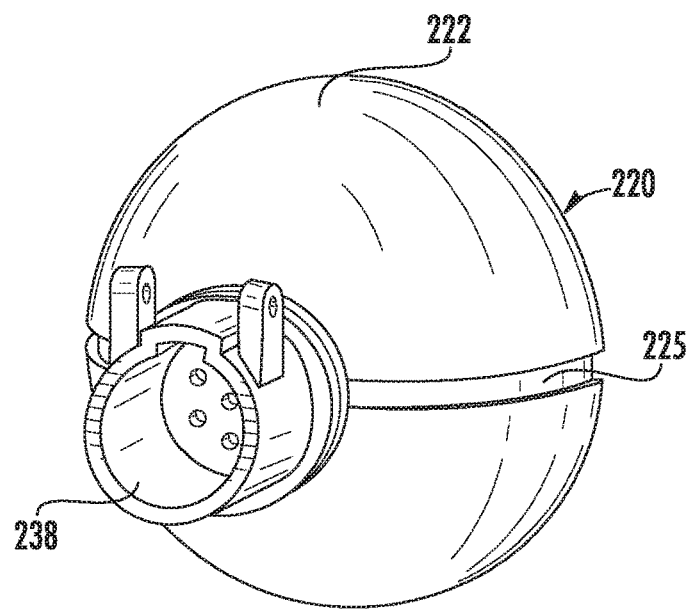
FIG. 27 illustrates a first hemispherical portion of the swivel connector of FIG. 26.

FIG. 27 illustrates a first hemispherical portion 220 in the form of a half sphere. Socket receptacle 238 is molded or cast within first hemispherical portion 220. An outer surface 222 of hemispherical portion 220 includes a revolved groove 225 formed therein, which may be oriented horizontally or vertically about the centerline axis of the connector. Groove 225 prevents arbitrary rotation of first hemispherical portion 220 and limits the connector rotation to a single axis relative to a second hemispherical portion 230.

Figure 28:
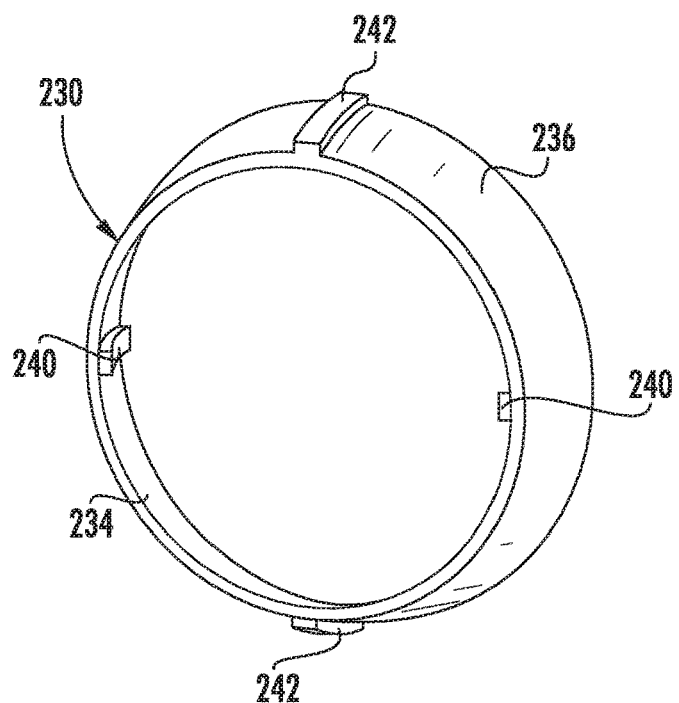
FIG. 28 illustrates a second hemispherical portion of the swivel connector of FIG. 26.
Figure 29A:
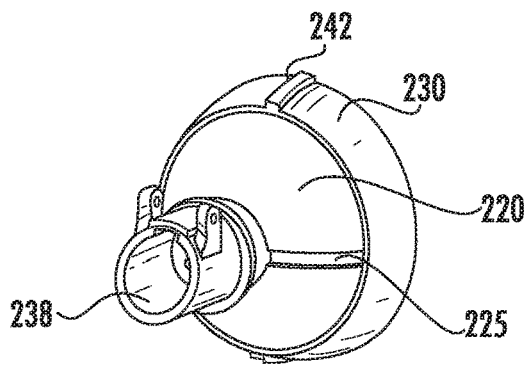
FIGS. 29A-29C illustrate the rotation of first and second hemispherical portions.
Figure 29B:
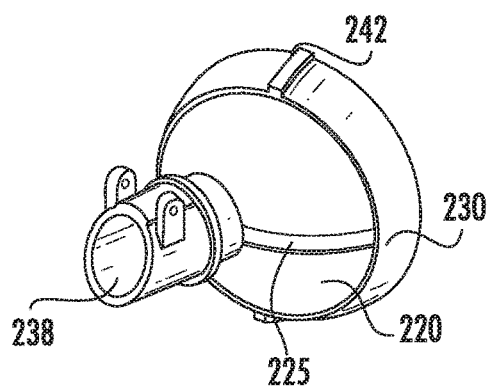
Figure 29C:
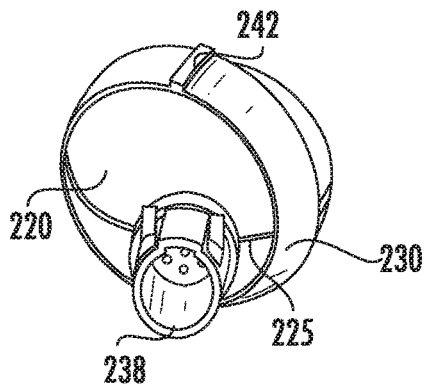
Figure 29D:
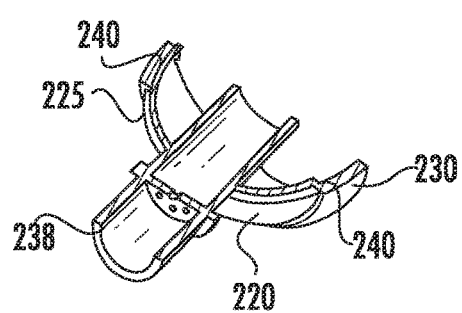
FIG. 29D is a cross-sectional view of first and second hemispherical portions.

Second hemispherical portion 230 is illustrated in FIG. 28 and is an intermediate member having hollow hemispherical geometry with an interior surface 234 and an exterior surface 236. Interior surface 234 includes inwardly extending revolved rib features 240 and exterior surface 236 includes outwardly extending revolved rib features 242. Inwardly extending revolved rib features 240 and outwardly extending revolved rib features 242 are oriented orthogonally opposite to one another. Inwardly extending revolved rib features 240 mates with revolved groove 225 on hemispherical portion 220 to allow second hemispherical portions 230 to rotate about a single axis relative to first hemispherical portion 220. FIGS. 29A-29C illustrate the rotation of first and second hemispherical portions 220 and 230 with respect to one another along groove 225. FIG. 29D is a cross-sectional view showing inwardly extending revolved rib feature 240 of second hemispherical portion 230 engaging groove 225 of first hemispherical portion 220.

Figure 30:
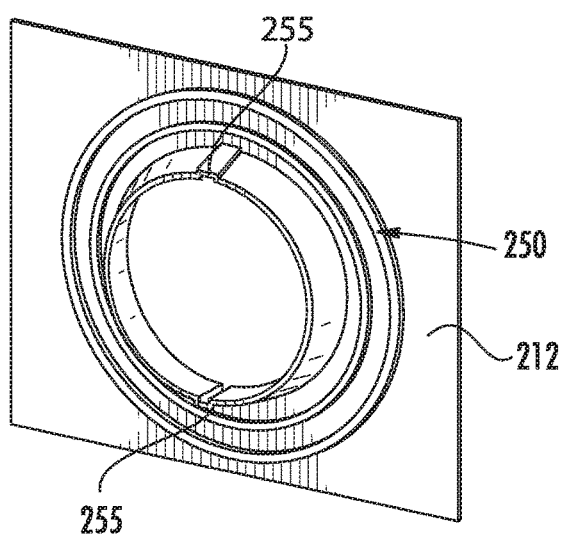
FIG. 30 illustrates a fixed hemispherical portion of the swivel connector of FIG. 26.

Outwardly extending revolved rib feature 242 prevents arbitrary rotation of second hemispherical portion 230 and limits the rotation of second hemispherical portion 230 to a single axis relative to a third, fixed hemispherical portion 250, which is shown in FIG. 30. Fixed hemispherical portion 250 is incorporated and integral to a stationary mounting structure. An inner surface 252 of the fixed hemispherical portion 250 includes an indented revolved groove feature 255 to mate with the revolved rib feature 242 on the outer surface 236 of hemispherical portion 230. Indented groove feature 255 on fixed hemispherical portion 250 prevents arbitrary rotation of second hemispherical portion 230 and limits the relative rotation of fixed hemispherical portion 250 and hemispherical portion 230 to a single axis. FIGS. 31A and 31B illustrate the rotation of hemispherical portion 230 in a vertical y-axis direction relative to fixed hemispherical portion 250. FIGS. 31C and 31D illustrate the horizontal x-axis rotation of first hemispherical portion 220 with respect to second hemispherical portions 230 as well as the simultaneous rotation of hemispherical portion 230 in a vertical direction relative to fixed hemispherical portion 250.

Figure 32C:
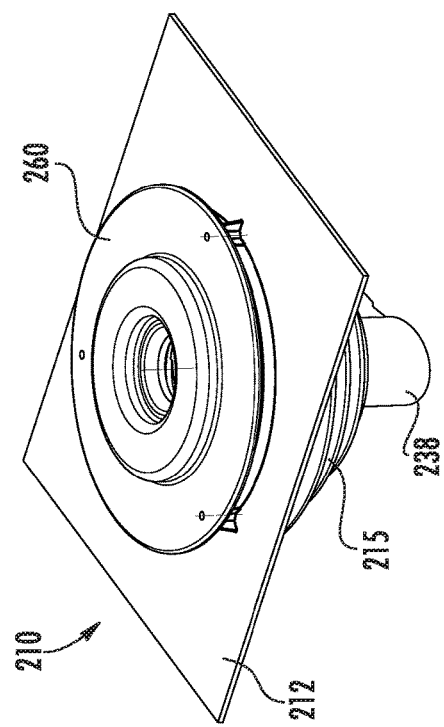
FIGS. 32A, 32B and 32C are top, cross-sectional and bottom perspective views of the swivel connector of FIG. 26.
Figure 32A:
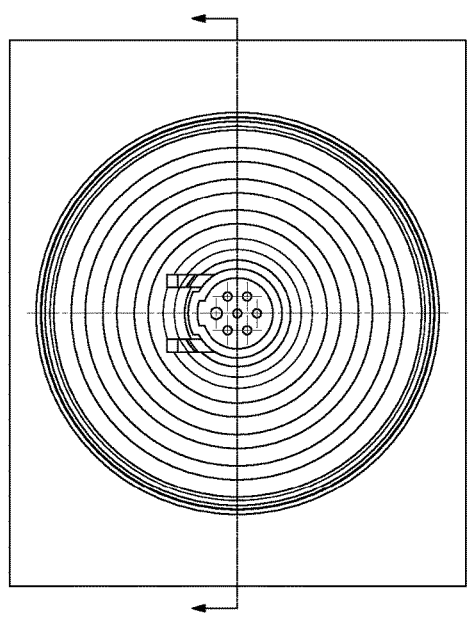
Figure 32B:
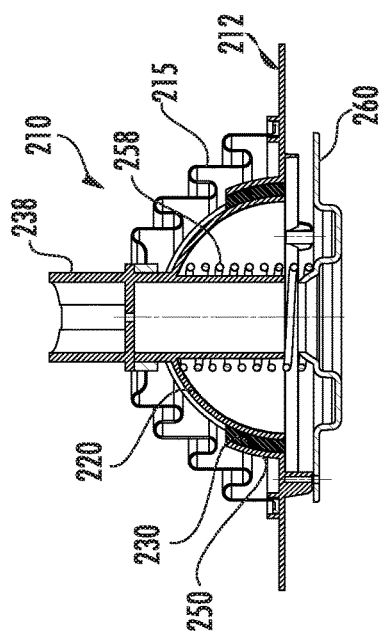
Figure 33B:
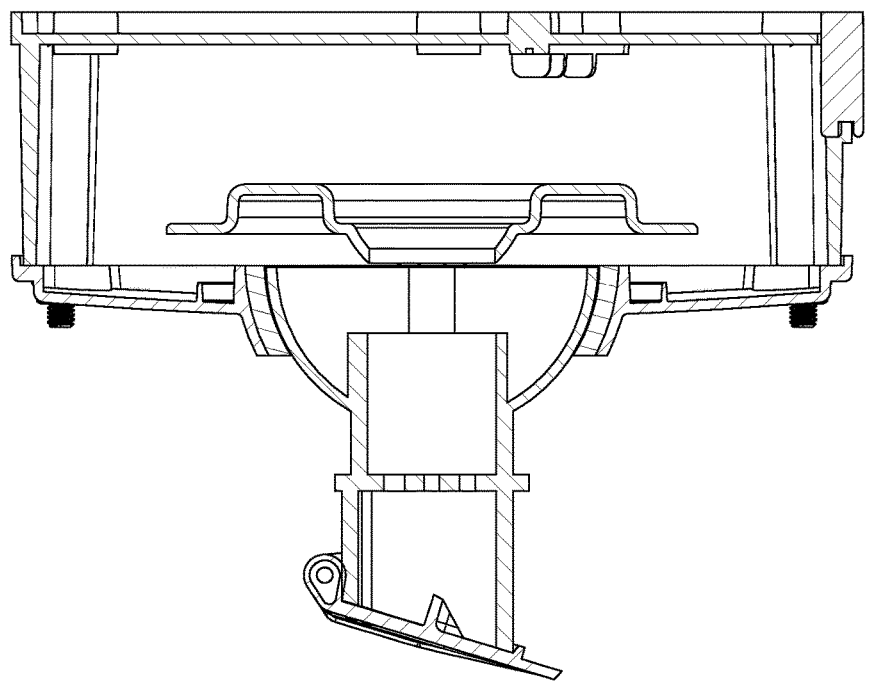
FIGS. 33A and 33B are front and cross-sectional views of the swivel connector 210 attached to a nosebox assembly.
Figure 33A:
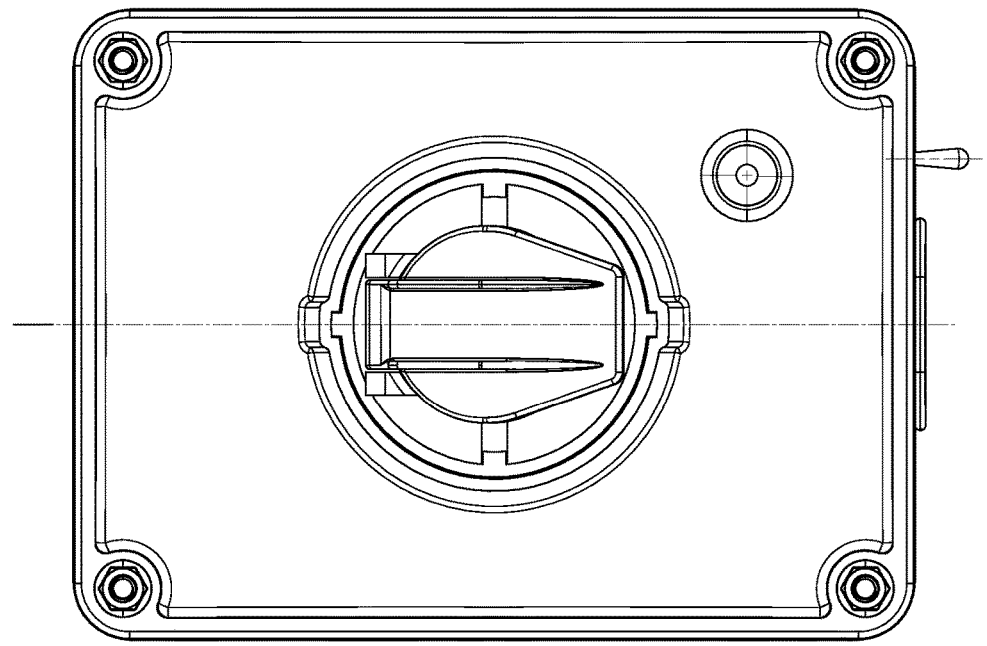
Figure 34:
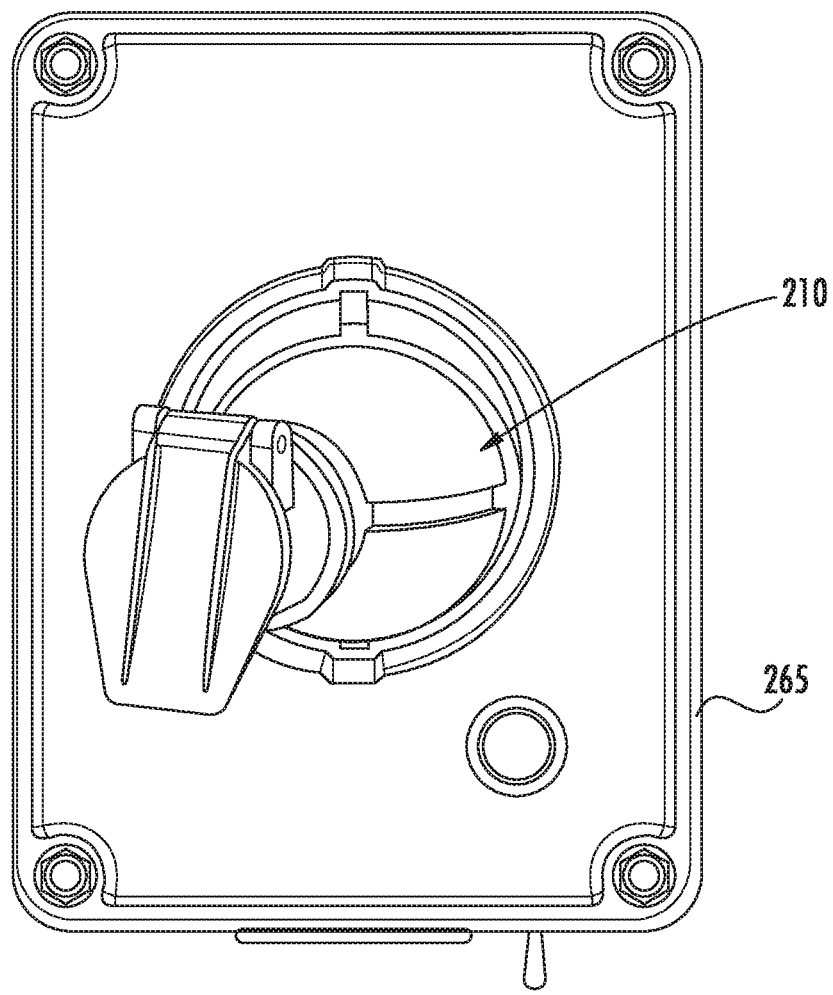
FIG. 34 is a front view of the swivel connector 210 attached to a nosebox assembly with the swivel assembly rotated horizontally.

FIGS. 32A, 32B and 32C are top, cross-sectional and bottom perspective views of swivel connector assembly 210. A compression spring 258 and supporting spring plate 260 apply adequate force to the stack-up of hemispherical portions to ensure a tight fit is maintained to resist separation of swivel connector assembly 210. Spring plate 260 provides a defined normal working length for compression spring 258 and is rigidly secured to mounting support structure 212. The compression spring and supporting spring plate allow the hemispherical portions to permit movement in any x, y, or z direction. Thermoplastic elastomer rubber boot 215 provides a water-resistant and dust-resistant interface between connector 238 and the outer surface of rigid mounting structure 212. FIGS. 33A and 33B are front and cross-sectional views of the swivel connector 210 attached to a nosebox assembly. FIG. 34 is a front view of the swivel connector 210 attached to a nosebox assembly with the swivel connector rotated horizontally.

Embodiments of the disclosure thus described may be varied and modified, as desired, to conform to additional standards or include designs that do not depart from the scope of the invention. Figures are not drawn to scale and any modification of size, shape, or dimension may be implemented to incorporate the components, assembly, and method of assembling and using here described. As presented, the multiple embodiments of the present invention offer several improvements over standard devices currently used. The improved assembly enhances linear and angular motion at the connection site. The connector is flexible and movable enough to reduce stress on the connector itself and permit the angular movement of the connector when attached to cabling at the tractor or trailer. The invention being thus described, it would be obvious that the same may be varied in many ways by one of ordinary skill in the art having had the benefit of the present disclosure. Such variations are not regarded as a departure from the spirit and scope of the invention, and such modifications as would be obvious to one skilled in the art are intended to be included within the scope of the following claims and their legal equivalents.

The invention claimed is:

1. A connector assembly comprising: a base mounting member configured to be secured to a supporting structure; an intermediate member capable of rotation about at least a first axis with respect to the base mounting member; and a socket mounting member configured to secure a socket receptacle wherein the socket mounting member engages with the intermediate member to allow rotation about at least a second axis, wherein the intermediate member couples the base mounting member and the socket mounting member to provide a non-rigid moveable socket that is configured to follow and approximate movement of attached electrical cables when acted upon by angular pull forces, further comprising bushings disposed between one or more of the members to serve as alignment and wear resistant features, wherein the bushings are formed of thermoplastic and include a central bore whereby mechanical fasteners protrude to secure the members.

2. A connector assembly comprising: a base mounting member configured to be secured to a supporting structure; an intermediate member capable of rotation about at least a first axis with respect to the base mounting member; and a socket mounting member configured to secure a socket receptacle wherein the socket mounting member engages with the intermediate member to allow rotation about at least a second axis, wherein the intermediate member couples the base mounting member and the socket mounting member to provide a non-rigid moveable socket that is configured to follow and approximate movement of attached electrical cables when acted upon by angular pull forces, wherein the supporting structure is a trailer, a chassis, a nosebox, or an adaptor plate, individually or in combination, wherein the nosebox comprises circuitry, switches, and terminals, and the nosebox is mounted to the adaptor plate and affixed to a trailer or a mobile structure.

3. The connector assembly of claim 2, wherein the first axis corresponds to the x-axis and the second axis corresponds to the y-axis, or vice versa, to provide two or more axes of rotation when the socket receptacle is attached to the socket mounting member to accommodate movement of one or more electrical cables at multiple angles.

4. The connector assembly of claim 2, further comprising a cable assembly attached thereto including a wiring overmold that encapsulates one or more cables and wiring, and a flexible boot.

5. The connector assembly of claim 4, wherein the flexible boot is water and dust resistant to protect against environmental intrusion into the nosebox.

6. The connector assembly of claim 5, wherein the flexible boot allows movement as the receptacle socket and the cable assembly rotate along the x-axis and the y-axis.

7. A connector assembly comprising: a base mounting member configured to be secured to a supporting structure; an intermediate member capable of rotation about at least a first axis with respect to the base mounting member; and a socket mounting member configured to secure a socket receptacle wherein the socket mounting member engages with the intermediate member to allow rotation about at least a second axis, wherein the intermediate member couples the base mounting member and the socket mounting member to provide a non-rigid moveable socket that is configured to follow and approximate movement of attached electrical cables when acted upon by angular pull forces, wherein the base mounting member includes a fixed hemispherical portion, the socket mounting member is a first hemispherical portion having the socket receptacle molded or cast therein, and the intermediate member is a second hemispherical portion.

8. The connector assembly of claim 7, wherein the fixed hemispherical portion has an outer surface including a revolved rib formed therein and oriented about the first axis, the first hemispherical portion is a half sphere having an outer surface with a revolved groove formed therein and oriented about the second axis, and the second hemispherical portion has an interior surface including one or more inwardly extending ribs and an exterior surface including one or more outwardly extending ribs, wherein the inwardly and outwardly extending ribs are positioned orthogonally opposite to one another.

9. The connector assembly of claim 8, wherein the inwardly extending ribs of the second hemispherical portion engage the revolved groove of the first hemispherical portion to allow the second hemispherical portion to rotate about a single axis relative to the first hemispherical portion and wherein the outwardly extending ribs of the second hemispherical portion engage the revolved groove of the fixed hemispherical portion.

10. The connector assembly of claim 9, wherein the revolved groove of the stationary hemispherical portion is configured to prevent arbitrary rotation of the second hemispherical portion and limits rotation of the first hemispherical portion.

11. The connector assembly of claim 10, wherein the first hemispherical portion rotates horizontally with respect to the second hemispherical portion, and the second hemispherical portion simultaneously rotates in a vertical direction relative to the stationary hemispherical portion, or vice versa.

12. The connector assembly of claim 11, wherein the hemispherical portions are covered by a flexible boot.

13. The connector assembly of claim 12, where in the flexible boot comprises one or more sealants.

14. The connector assembly of claim 13, further comprising a compression spring and a supporting spring plate, individually or in combination, that applies a force to a stack-up of one or more of the first, second and stationary hemispherical portions to ensure a tight fit and permit movement along a z-axis.

15. The connector assembly of claim 14, further comprising an overmolded cable assembly having a first end for mating to the socket receptacle and a second end having a groove formed therein for engaging a flexible boot.

16. The connector assembly of claim 15, wherein the overmolded cable assembly comprises cut out portions and ribs to provide flexibility.

17. A method of securing a swivel connector assembly to a supporting structure, the swivel connector assembly comprising: attaching a base mounting member to the supporting structure; interconnecting an intermediate member to the base mounting member to allow rotation of the intermediate member about at least a first axis; and engaging a socket mounting member with the intermediate member such that the socket mounting member is capable of attaching a socket receptacle to allow rotation about at least a second axis; wherein rotation about the first axis and the second axis accommodates angular movement of attached electrical cables, further comprising a step of integrating a compression spring and a supporting spring plate, individually or in combination, with the swivel connector assembly to permit movement along a z-axis.

18. The method of claim 17, wherein the base mounting member is non-rigidly attached to the supporting structure to accommodate movement of the swivel connector assembly along an x-axis, y-axis, and z-axis, alone or in combination.

19. The method of claim 18, wherein swivel connector assembly rotates along the x-axis and the y-axis in horizontal and vertical directions, respectively, when the removable socket receptacle is attached to the socket mounting member to accommodate movement of one or more electrical cables.

20. The method of claim 17, further comprising a step of attaching the swivel connector assembly to a mobile unit and connecting the electrical cables from the tractor to the mobile unit at the swivel connector assembly, wherein the socket receptacle rotates about the x-axis and y-axis to follow and approximate movement of a tractor as the electrical cables stretch.

21. The method of claim 20, further comprising steps of applying one or more angular pull forces to one or more electrical cables attached at the socket receptacle with the socket mounting member, and providing a non-rigid moveable socket that flexibly follows movement of attached electrical cables when acted upon by the angular pull forces.

* * * * *